(12) United States Patent
Shimizu

(10) Patent No.: US 12,085,633 B2
(45) Date of Patent: Sep. 10, 2024

(54) WALL PROFILE MEASUREMENT APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 17/655,428

(22) Filed: Mar. 18, 2022

(65) Prior Publication Data

US 2022/0206134 A1     Jun. 30, 2022

Related U.S. Application Data

(63) Continuation of application No. PCT/JP2020/035083, filed on Sep. 16, 2020.

(30) Foreign Application Priority Data

Sep. 19, 2019    (JP) ............................... J2019-170243

(51) Int. Cl.
*G01S 13/46*      (2006.01)
*B60Q 9/00*      (2006.01)
(Continued)

(52) U.S. Cl.
CPC ............... *G01S 13/46* (2013.01); *G01S 7/41* (2013.01); *G01S 13/89* (2013.01); *G01S 13/931* (2013.01); *B60Q 9/00* (2013.01)

(58) Field of Classification Search
CPC . G01S 13/46; G01S 7/41; G01S 13/89; G01S 13/931; B60Q 9/00
(Continued)

(56) References Cited

U.S. PATENT DOCUMENTS 9,731,728 B2 *   8/2017   Nguyen Van ............. G01S 7/40
9,947,219 B2 *   4/2018   Rolle .................... G06F 18/214
(Continued)

FOREIGN PATENT DOCUMENTS

EP           3086990 B1 *   7/2021            B60Q 1/525
JP       2008190964 A *   8/2008            G01S 13/347
WO   WO-2014129445 A1 *   8/2014            G01S 15/10

*Primary Examiner* — Nuzhat Pervin
(74) *Attorney, Agent, or Firm* — MASCHOFF BRENNAN

(57) ABSTRACT

A measurement apparatus repeatedly executes measurement determination of whether measurement of a wall object has succeeded. If the wall-object measurement has succeeded, the measurement apparatus calculates an instantaneous wall-distance value indicative of a distance of the wall object from the own object. Otherwise, if the wall-object measurement has not succeeded, the measurement apparatus executes first extrapolation of an additional instantaneous wall-distance value. The measurement apparatus prevents an additional execution of the first extrapolation upon determination that the frequency of continuously repeated executions of the first extrapolation is not less than a prevention threshold frequency. The measurement apparatus sets, if the result of the measurement determination is correct, a correct-state threshold as the prevention threshold frequency, and sets, if the result of the measurement determination is incorrect, an incorrect-state threshold as the prevention threshold frequency; the incorrect-state threshold is smaller than the correct-state threshold.

11 Claims, 9 Drawing Sheets

(51) Int. Cl.
*G01S 7/41* (2006.01)
*G01S 13/89* (2006.01)
*G01S 13/931* (2020.01)

(58) Field of Classification Search
USPC .......................................................... 342/118
See application file for complete search history.

(56) References Cited

U.S. PATENT DOCUMENTS

| | | | | |
|---|---|---|---|---|
| 10,416,676 | B2* | 9/2019 | Naka | G05D 1/0088 |
| 10,490,081 | B2* | 11/2019 | Shimizu | G01S 13/87 |
| 10,569,767 | B2* | 2/2020 | Takaki | G01S 13/931 |
| 10,654,473 | B2* | 5/2020 | Kim | B60W 10/18 |
| 10,980,431 | B2* | 4/2021 | Olde | A61B 5/0215 |
| 11,027,653 | B2* | 6/2021 | Kim | G01S 13/87 |
| 2007/0241870 | A1* | 10/2007 | Ohmura | G01S 13/931 |
| | | | | 340/435 |
| 2011/0187582 | A1* | 8/2011 | Tsunekawa | G08G 1/166 |
| | | | | 342/107 |
| 2016/0299216 | A1* | 10/2016 | Matsumoto | G01S 13/867 |
| 2017/0345312 | A1* | 11/2017 | Shimizu | B60R 21/00 |
| 2023/0168358 | A1* | 6/2023 | Cieslar | B60W 40/114 |
| | | | | 342/70 |

* cited by examiner

US 12,085,633 B2

WALL PROFILE MEASUREMENT APPARATUS

CROSS-REFERENCE TO RELATED APPLICATION

The present application is a bypass continuation application of a currently pending international application No. PCT/JP2020/035083 filed on Sep. 16, 2020 designating the United States of America, the entire disclosure of which is incorporated herein by reference, the international application being based on and claiming the benefit of priority of Japanese Patent Application No. 2019-170243 filed on Sep. 19, 2019.

TECHNICAL FIELD

The present disclosure relates to wall profile measurement apparatuses for measuring the profile of a wall object installed on a road.

BACKGROUND

An available measurement technology measures, using one of more radar devices, the profile of a wall object located to be lateral to a vehicle using one of more radar devices.

SUMMARY

A measurement apparatus according to an exemplary aspect of the present disclosure repeatedly executes measurement determination of whether measurement of a wall object has succeeded. If the wall-object measurement has succeeded, the measurement apparatus calculates an instantaneous wall-distance value indicative of a distance of the wall object from the own object. Otherwise, if the wall-object measurement has not succeeded, the measurement apparatus executes first extrapolation of an additional instantaneous wall-distance value. The measurement apparatus prevents an additional execution of the first extrapolation upon determination that the frequency of continuously repeated executions of the first extrapolation is not less than a prevention threshold frequency. The measurement apparatus sets, if the result of the measurement determination is correct, a correct-state threshold as the prevention threshold frequency, and sets, if the result of the measurement determination is incorrect, an incorrect-state threshold as the prevention threshold frequency; the incorrect-state threshold is smaller than the correct-state threshold.

DETAILED DESCRIPTION OF EMBODIMENTS

Figure 1:
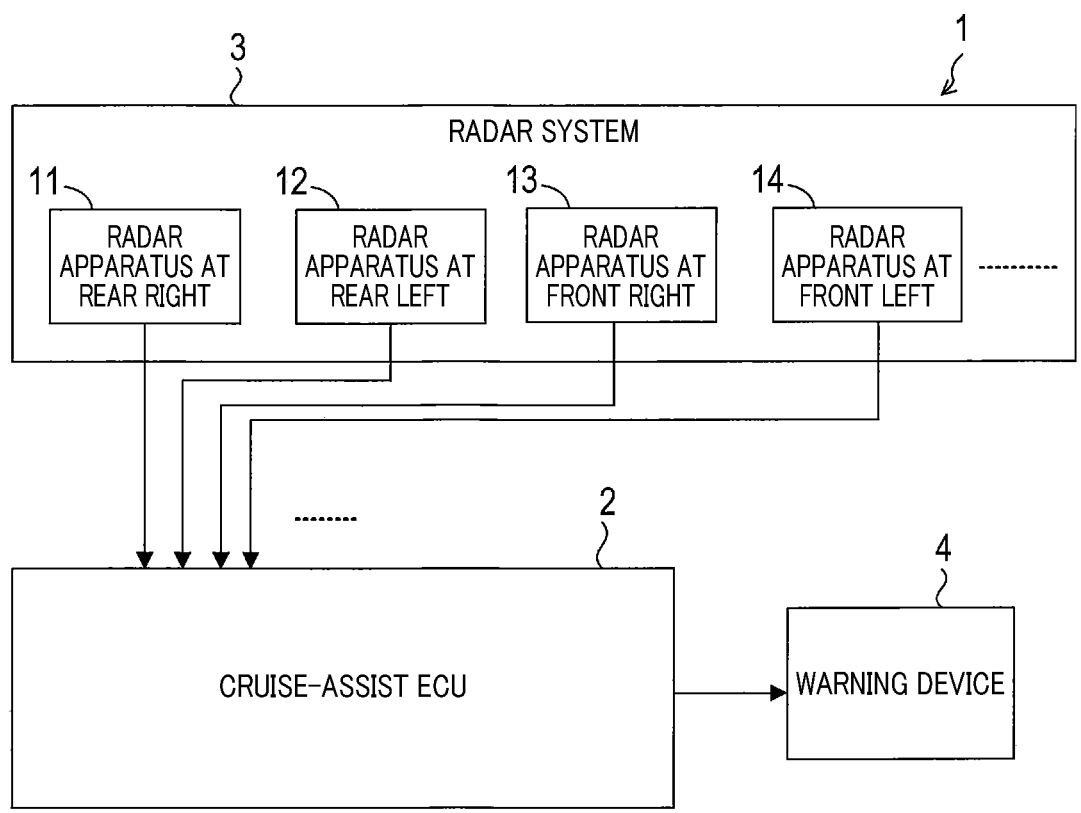
FIG. 1 is a block diagram illustrating a configuration of a vehicular system according to an exemplary embodiment.

Japanese Patent Application Publication No. 2016-85567 discloses a measurement technology designed to use one or more radar devices installed in a vehicle to determine distance information indicative of a measured distance of a wall object relative to the vehicle; the wall object is located to be lateral to the vehicle. Then, the measurement technology is designed to calculate the profile of the wall object in accordance with the distance information and the track of the vehicle along which the vehicle has traveled.

The inventor has focused on a situation where there is an additional vehicle between a wall object and an own vehicle in which one or more radar devices are installed. The inventor has considered application of the above measurement technology to the focused situation. As a result, the inventor has found out that the measurement technology may misrecognize a near side of the additional vehicle as the wall object, and may erroneously calculate, based on the misrecognized near side of the additional vehicle, the profile of the wall object whose location is closer to the own vehicle than an actual location of the wall object.

The present disclosure aims to provide one or more technologies, each of which is capable of minimizing erroneous calculations of a location of a wall object to be closer to an own vehicle than an actual location of the wall object.

A first exemplary measure of the present disclosure is a wall profile measurement apparatus to be installed in an own vehicle. The wall profile measurement apparatus includes a wall measurement determiner, a wall distance calculator, a wall profile calculator, an extrapolation unit, a correctness determiner, and an extrapolation frequency setter.

The wall measurement determiner is configured to repeatedly perform a determination task of (i) transmitting a radar-wave signal to a corresponding measurement range, (ii) receiving, as a received signal, an echo signal resulting from reflection of the radar-wave signal by an object, and (iii) executing, based on the received signal, determination of whether measurement of a wall object located along a road on which the own vehicle travels has succeeded.

The wall distance calculator is configured to calculate an instantaneous wall-distance value indicative of a distance of the wall object from the own object in response to each determination that measurement of the wall object has succeeded.

The wall profile calculator is configured to calculate a plurality of wall-profile values in accordance with a trajectory of the own vehicle and the calculated instantaneous wall-distance values. Each of the wall-profile values represents a location of a corresponding part of the wall object.

The extrapolation unit is configured to execute a first extrapolation of an additional instantaneous wall-distance value in response to each determination that measurement of the wall object has not succeeded.

The extrapolation prevention unit is configured to determine whether a frequency of continuously repeated executions of the first extrapolation is not less than a prevention threshold frequency, and prevent an additional execution of the first extrapolation in response to determination that the frequency of continuously repeated executions of the first extrapolation is not less than the prevention threshold frequency.

The correctness determiner is configured to determine whether a result of the determination of whether the measurement of the wall object has succeeded is correct, and an extrapolation frequency setter.

The extrapolation frequency setter is configured to
1. Set, in response to determination that the result of the determination of whether the measurement of the wall object has succeeded is correct, a correct-state threshold as the prevention threshold frequency
2. Set, in response to determination that the result of the determination of whether the measurement of the wall object has succeeded is incorrect, an incorrect-state threshold as the prevention threshold frequency, the incorrect-state threshold being smaller than the correct-state threshold The wall profile measurement apparatus configured set forth above executes, in response to each determination that measurement of the wall object has not succeeded, a first extrapolation of an additional instantaneous wall-distance value.

For this reason, if a first situation where there is no adjacent other vehicle between the wall object and the own vehicle is changed to a second situation where there is an adjacent other vehicle between the wall object and the own vehicle, the wall profile measurement apparatus determines a difficulty in measuring the wall object, and calculates one or more additional instantaneous wall-distance values after the difficulty determination based on the instantaneous wall-distance value calculated immediately before the difficulty determination. This configuration of the wall profile measurement apparatus prevents the profile of the wall object from being calculated to be closer to the own vehicle than an actual location of the wall object.

Let us assume a situation where an adjacent other vehicle is located on a right or left side of the stopped own vehicle. In this situation, the wall profile measurement apparatus may measure the near side of the adjacent other vehicle as a wall object and accordingly calculate an instantaneous wall-distance value for the misrecognized wall object. Thereafter, when the own vehicle starts to travel earlier than the adjacent other vehicle, no adjacent other vehicle is located on the right or left side of the own vehicle. Thereafter, if the wall profile measurement apparatus cannot measure a wall object located on the right or left side of the own vehicle because the wall object is located to be extremely far from the own vehicle or there are no wall objects, the wall profile measurement apparatus is configured to extrapolate a distance value between the stopped own vehicle and the adjacent other vehicle as an additional instantaneous wall-distance value for the misrecognized wall object.

From this viewpoint, in response to determination that the result of the determination of whether the measurement of the wall object has succeeded is incorrect, the wall profile measurement apparatus is configured to set the correct-state threshold as the prevention threshold frequency to be smaller than the incorrect-state threshold; the incorrect-state threshold is set as the prevention threshold frequency in response to determination that the result of the determination of whether the measurement of the wall object has succeeded is correct. This configuration reduces continuation of the profile of the wall object being calculated to be closer to the own vehicle than the actual location of the wall object.

Exemplary Embodiment

The following describes an exemplary embodiment of the present disclosure with reference to the accompanying drawings. In the exemplary embodiment and its modifications, descriptions of like parts between the exemplary embodiment and its modifications, to which like reference characters are assigned, are omitted or simplified to avoid redundant descriptions.

A vehicular system 1 according to the exemplary embodiment includes, as illustrated in FIG. 1, a cruise-assist electronic control unit (ECU) 2, a radar system 3, and a warning device 4. The vehicular system 1 according to the exemplar embodiment is installed in a vehicle, such as a four-wheel vehicle. The vehicle in which the vehicular system 1 is installed will be referred to as an own vehicle.

The radar system 3 includes a plurality of, i.e., at least four, radar devices 11, 12, 13, and 14. The radar device 11 is mounted at the right side of the rear of the own vehicle, the radar device 12 is mounted at the left side of the rear of the own vehicle, the radar device 13 is mounted at the right side of the front of the own vehicle, and the radar device 14 is mounted at the left side of the front of the own vehicle.

Each of the radar devices 11 to 14 has a predetermined measurement range of objects.

The radar device 11 is mounted at the right side of the rear of the own vehicle such that the measurement range covers a region defined between a predetermined length from the own vehicle in the rearward direction and a predetermined length from the own vehicle in the rightward direction. The radar device 11 is configured to capture information about one or more objects located on the right side or rear-right side of the own vehicle included in the measurement range thereof.

The radar device 12 is mounted at the left side of the rear of the own vehicle such that the measurement range covers a region defined between a predetermined length from the own vehicle in the rearward direction and a predetermined length from the own vehicle in the leftward direction. The radar device 12 is configured to capture information about one or more objects located on the left side or rear-left side of the own vehicle included in the measurement range thereof.

The radar device 13 is mounted at the right side of the front of the own vehicle such that the measurement range covers a region defined between a predetermined length from the own vehicle in the forward direction and a predetermined length from the own vehicle in the rightward direction. The radar device 13 is configured to capture information about one or more objects located on the right side or front-right side of the own vehicle in the measurement range thereof.

The radar device 14 is mounted at the left side of the front of the own vehicle such that the measurement range covers a region defined between a predetermined length from the own vehicle in the forward direction and a predetermined length from the own vehicle in the leftward direction. The radar device 12 is configured to capture information about one or more objects located on the left side or front-left side of the own vehicle in the measurement range thereof.

Each radar device 11, 12, 13, 14 can employ at least one of available various measurement modes, such as a known FMCW mode and a known dual-frequency CW mode. Each radar device 11, 12, 13, 14 according to the exemplary embodiment is designed as a millimeter-wave radar employing the FMCW mode.

The radar devices 11, 12, 13, and 14, which constitute the radar system 3, basically have a predetermined structure and predetermined functions.

Figure 2:
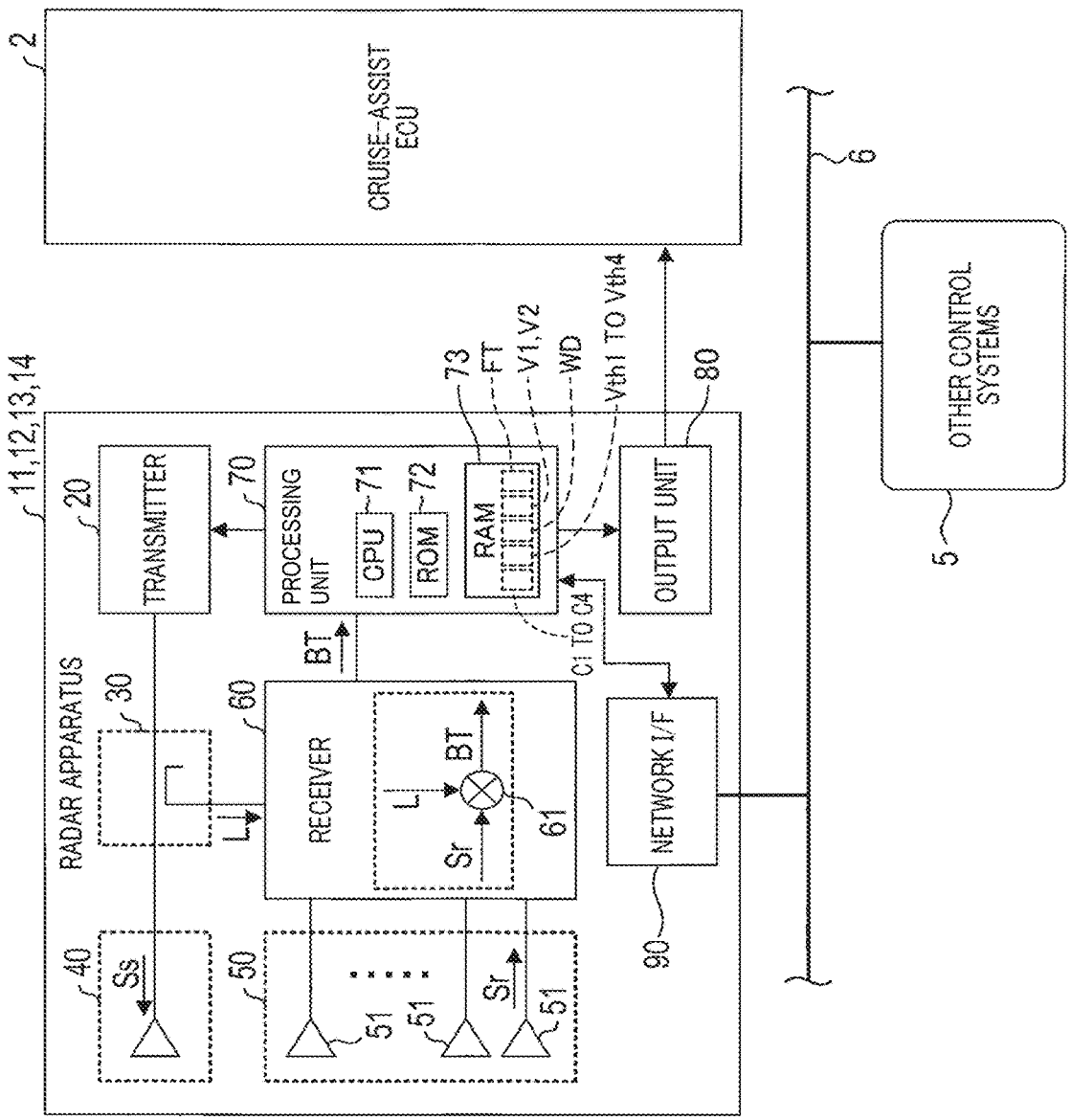
FIG. 2 is a block diagram illustrating a configuration of each radar device illustrated in FIG. 1.

Referring to FIG. 2, each of the radar devices 11, 12, 13, and 14 is configured to cyclically perform a measurement task of transmitting continuous radar-wave signals that at least one object reflect, and receiving echo signals generated based on the reflection. Each of the radar devices 11, 12, 13, and 14 is configured to analyze, as received signals Sr, the received echo signals to thereby measure a distance D of the at least one object from the own vehicle, a relative speed Vr of the at least one object relative to the own vehicle, and an azimuth θ of the at least one object relative to the own vehicle. The distance D, relative speed Vr, and the azimuth θ of the at least one object will be referred to as observation information (D, Vr, θ) of the at least one object.

One measurement task cyclically carried out by each of the radar devices 11, 12, 13, and 14 will be referred to as a measurement cycle.

Each of the radar devices 11, 12, 13, and 14 is configured to analyze the observation information (D, Vr, θ) of the at least one object to thereby generate drive-assist information for assisting the driver's driving operations of the own vehicle. Each of the radar devices 11, 12, 13, and 14 is additionally configured to output, to the cruise-assist ECU 2, the drive-assist information.

The cruise-assist ECU 2 is configured to perform, based on the drive-assist information outputted from each of the radar devices 11, 12, 13, and 14, various tasks for assisting the driver's driving operations of the own vehicle. The various tasks related to the assistance of the driver's driving operations of the own vehicle for example include 1. A task of issuing a warning to the driver in response to determination that an object is approaching the own vehicle.

2. A task of controlling a braking system and/or a steering system, which are installed in the own vehicle, to accordingly avoid the collision of the own vehicle with an approaching object and/or making an automatic lane change of the own vehicle Each of the radar devices 11, 12, 13, and 14 includes a transmitter 20, a splitter 30, a transmit antenna 40, a receive antenna module 50, a receiver 60, a processing unit 70, an output unit 80, and a network interface 90, which will be referred to as a network I/F 90.

The transmitter 20 is configured to supply a high-frequency transmitting signal Ss with a wavelength that is in a millimeter range to the transmit antenna 40 through the splitter 30. In particular, the transmitter is configured to transmit, to the transmit antenna 40 through the splitter 30, a chirp signal as the transmitting signal Ss; the chirp signal has a frequency that has a repetition of a predetermined modulation pattern. The predetermined modulation pattern is comprised of a first modulation pattern in which the frequency rises over time for a predetermined first interval and a second modulation pattern in which the frequency falls over time for a predetermined second interval. The repetition period of the modulation pattern of the chirp signal will be referred to as a modulation period Tm.

That is, the transmitter 20 is configured to generate, for the first interval, an up-chirp signal as the transmitting signal Ss whose frequency is modulated to rise over time, and generate, for the second interval, a down-chirp signal as the transmitting signal Ss whose frequency is modulated to fall over time.

The splitter 30 is configured to split the transmitting signal Ss into two transmitting signal Ss, and transmit one of the two transmitting signals Ss to the transmit antenna 40, and transmit the other thereof to the receiver 60 as a local signal L.

The transmit antenna 40 is configured to transmit a radar wave signal with a frequency matching the frequency of the transmitting signal Ss transmitted from the splitter 30.

The receive antenna module 50 is configured to receive an echo signal resulting from reflection of the radar wave signal by one or more objects. The receive antenna module 50 is comprised of a plurality of receive antennas 51 arranged in line. Each receive antenna 51 of the receive antenna module 50 is configured to receive an echo signal resulting from reflection of the radar wave signal by one or more objects, so that the echo signal received by each receive antenna 51 is inputted to the receiver 60 as a received signal Sr.

The receiver 60 is configured to manipulate the received signals Sr inputted thereto from the respective receive antennas 51 to accordingly generate beat signals BT for the respective receive antennas 51.

Specifically, the receiver 60 includes a mixer 61. The mixer 61 of the receiver 60 is configured to mix the received signal Sr inputted from each receive antenna 51 with the local signal L inputted thereto from the splitter 30 to accordingly generate the beat signal BT for each receive antenna 51.

If an up-chirp radar wave signal with a frequency matching the frequency of the up-chirp signal as the transmitting signal Ss is transmitted from the splitter 30 as the radar wave signal, the beat signal BT for each receive antenna 51, which is generated based on mixture of the local signal L and the received signal Sr, will be referred to as an up-beat signal BT for the corresponding receive antenna 51. Similarly, if a down-chirp radar wave signal with a frequency matching the frequency of the down-chirp signal as the transmitting signal Ss is transmitted from the splitter 30 as the radar wave signal, the beat signal BT for each receive antenna 51, which is generated based on mixture of the local signal L and the received signal Sr, will be referred to as a down-beat signal BT for the corresponding receive antenna 51.

Although descriptions are omitted, the receiver 60 is configured to, before mixing the received signal Sr for each receive antenna 51 with the local signal L through the mixer 61, amplify the received signal Sr for each receive antenna 51, and thereafter mix the amplified received signal Sr for each receive antenna 51 with the local signal L to accordingly generate the beat signal BT for the corresponding receive antenna 51. The receiver 60 is also configured to eliminate unnecessary signal components from the beat signal BT for each receive antenna 51.

The receiver 60 is additionally configured to convert the beat signal BT for each receive antenna 51 into digital data, i.e., a digital beat signal BT, for the corresponding receive antenna 51, and output, to the processing unit 70, the digital beat signal BT for each receive antenna 51. The digital beat signal BT for each receive antenna 51, which are inputted in the processing unit 70 and manipulated thereby, will be simply referred to as a beat signal BT for each receive antenna 51.

The processing unit 70 is designed as an electronic control unit including mainly a microcomputer that is comprised of a CPU 71, a ROM 72, a RAM 73, and other peripheral devices. The CPU 71 executes programs stored in, for example, the ROM 72, which is an example of a nonvolatile tangible memory medium, to thereby implement various functions installed in the microcomputer, and perform various methods corresponding to the respective programs. That is, the ROM 72 of the exemplary embodiment serves as a nonvolatile tangible storage medium in which the programs are stored.

At least one or more hardware ICs can implement at least one or all of the functions implementable by the CPU 71. A plurality of microcomputers can constitute the processing unit 70.

The processing unit 70 can include one or more coprocessors that are programmed to carry out various tasks, such as fast-Fourier-transform (FFT) processing.

The processing unit 70 of each of the radar devices 11, 12, 13, and 14 is configured to calculate, based on the frequency of the up-beat signal BT and the frequency of the down-beat signal BT, the distance D of at least one object that reflects each of the up-chirp and down-chirp radar wave signals and the relative speed Vr thereof in accordance with the following expressions (1) and (2):

$$D = \frac{c \times Tm}{8 \times \Delta F}(fbu + fbd) \quad (1)$$

$$Vr = \frac{c}{4 \times f0}(fbu - fbd) \quad (2)$$

where:
fbu represents the frequency of the up-beat signal BT;
fbd represents the frequency of the down-beat signal BT
c represents the speed of light;
ΔF represents a fluctuation band of the frequency of the transmitting signal Ss; and
f0 represents the center frequency of the transmitting signal Ss.

The network I/F 90 serves as a communication interface (I/F) that enables the processing unit 70 to perform data communications with other control systems 5 via a network 6. The exemplary embodiment uses, as the network 6, an available vehicular network, such as a well-known controller area network (CAN®).

The other control systems 5 can include vehicular devices, such as ECUs and sensors, except for the cruise-assist ECU 2, which are installed in the own vehicle.

The processing unit 70 is configured to receive, through the network 6, various items of an odometry information set that are regularly transmitted from at least one of the other control systems 5. The odometry information set includes, for example, a speed of the own vehicle, which will be referred to as a vehicle speed Vs, a yaw rate of the own vehicle, which will be referred to as a yaw rate ω, a steering angle of the own vehicle, which will be referred to as a steering angle α, and a turning radius of the own vehicle, which will be referred to as a turning radius Rs.

Specifically, an unillustrated vehicle speed sensor, an unillustrated yaw rate sensor, and an unillustrated steering angle sensor are installed in the own vehicle. The vehicle speed sensor is configured to output, to the at least one of the other control systems 5, a measurement signal related to the speed of the own vehicle, and the at least one of the other control systems 5 is configured to calculate, based on the measurement signal from the vehicle speed sensor, the vehicle speed Vs. Similarly, the yaw rate sensor is configured to output, to the at least one of the other control systems 5, a measurement signal related to the raw rate of the own vehicle, and the at least one of the other control systems 5 is configured to calculate, based on the measurement signal from the yaw rate sensor, the yaw rate ω. Additionally, the steering angle sensor is configured to output, to the at least one of the other control systems 5, a measurement signal related to the steering angle of the own vehicle, and the at least one of the other control systems 5 is configured to calculate, based on the measurement signal from the steering angle sensor, the steering angle α.

The at least one of the other control systems 5 is also configured to calculate turning radius Rs as a function of the steering angle α. The processing unit 70 of each of the radar devices 11, 12, 13, and 14 can be configured to calculate, based on the steering angle α obtained through the network 6, the turning radius Rs in place of obtaining the turning radius Rs through the network 6.

The CPU 71 of each of the radar devices 11 and 12 included in the vehicular system 1 configured set forth above is programmed to perform a wall profile calculation routine and an extrapolation frequency determination routine.

First, the following describes the wall profile calculation routine carried out by the CPU 71 of the radar device 11 for measuring a right-side wall located at the right side of the own vehicle. The CPU 71 is programmed to periodically perform the wall profile calculation routine. One cycle of the periodically performed wall profile calculation routine will be referred to as a control cycle associated with the measurement cycle.

Figure 3:
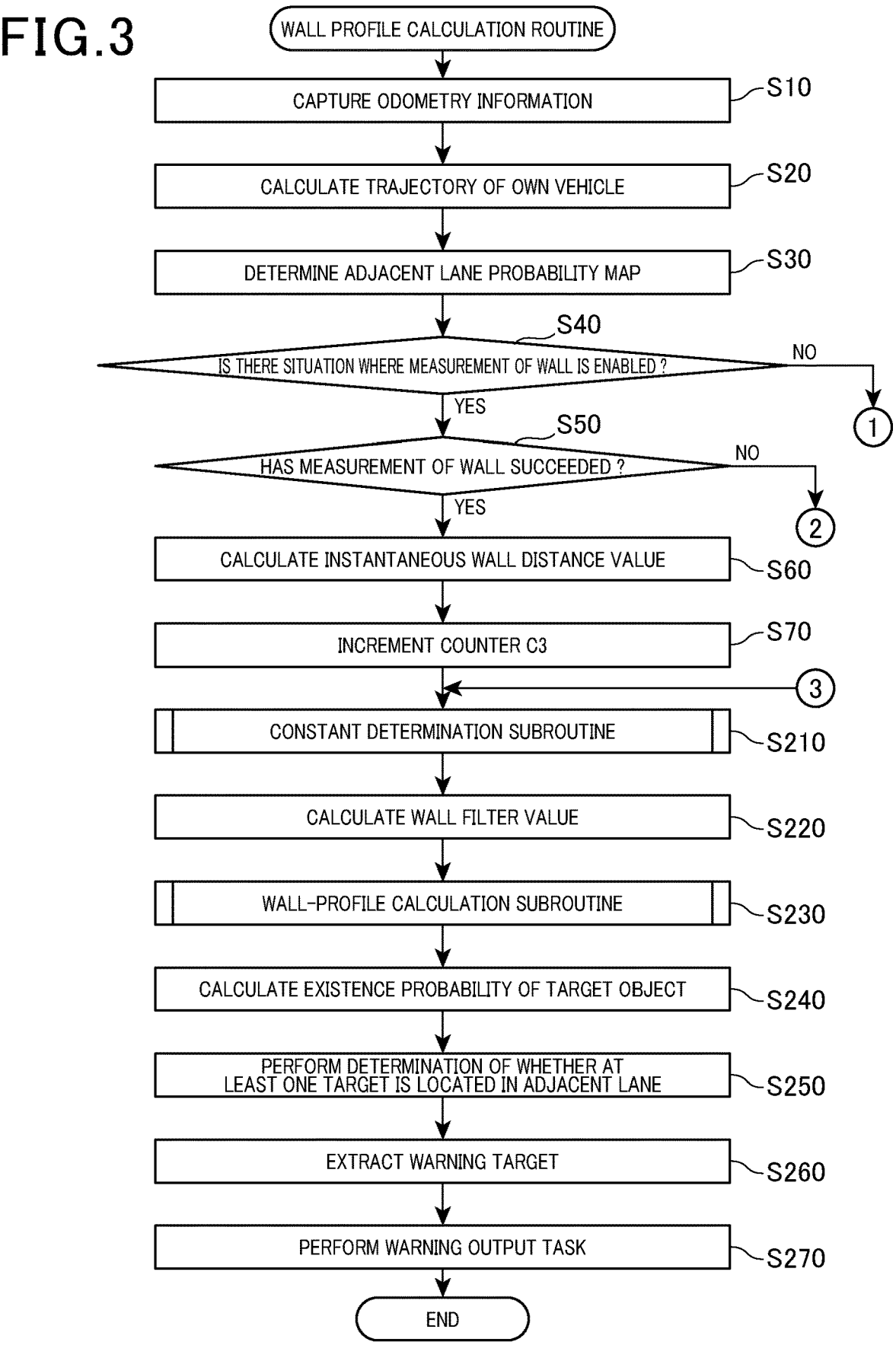
FIG. 3 is a flowchart illustrating a first part of a wall profile calculation routine.

When starting a current control cycle of the wall profile calculation routine, the CPU 71 captures the odometry information set from the at least one of the other control systems 5 through the network 6 in step S10 of FIG. 3. The odometry information set captured in step S10 includes, for example, at least the vehicle speed Vs, the yaw rate ω, and the turning radius Rs.

Let us assume that at least N control cycles have been carried out on or before the current control cycle; N is an integer more than or equal to 2.

The CPU 71 stores, in the RAM 73, the odometry information set captured in step S10 of the current control cycle.

This results in the odometry information set captured in step S10 of the immediately previous control cycle, i.e., the first previous control cycle, the odometry information set captured in step S10 of the second previous control cycle, . . . , and the odometry information set captured in step S10 of the Nth previous control cycle, being stored in the RAM 73.

The odometry information set captured in step S10 of the first previous control cycle will be referred to as a first previous odometry information set, the odometry information set captured in step S10 of the second previous control cycle will be referred to as a second previous odometry information set, . . . , and the odometry information set captured in step S10 of the Nth previous control cycle will be referred to as an Nth previous odometry information set. The integer N can be previously determined based on, for example, a predetermined distance limit measurable from the own vehicle, such as 100 meters rearward of the own vehicle.

Next, the CPU 71 calculates a trajectory of the own vehicle that has traveled from an estimated location of the own vehicle at the Nth previous control cycle to the current location of the own vehicle in step S20.

Specifically, in step S20, the CPU 71 calculates an estimated location of the own vehicle at the first previous control cycle as an estimated first previous vehicle location, an estimated location of the own vehicle at the second previous control cycle as an estimated second previous vehicle location, . . . , and the estimated location of the own vehicle at the Nth previous control cycle as an estimated Nth previous vehicle location in accordance with the first to Nth previous odometry information sets stored in the RAM 73.

Then, the CPU 71 links the estimated Nth previous vehicle location, . . . , the estimated first previous vehicle location, and the estimated current location of the own vehicle, i.e., the estimated current vehicle location, to each other to accordingly calculate a line extending from the estimated Nth previous vehicle location to the estimated current vehicle location as the trajectory of the own vehicle in step S20.

Because one or more technologies for calculating the trajectory of the own vehicle are well known, the detailed descriptions of them are omitted.

In particular, the odometry information set captured in step S10 may contain an error due to various factors including, for example, noise and a measurement error contained in the measurements of the vehicle speed sensor and/or the yaw rate sensor.

For addressing such an error, the CPU 71 calculates an estimated existence range of each of the estimated first to Nth previous vehicle locations for addressing such an error if at least one of the estimated first to Nth previous vehicle locations is affected by the error in step S20. The estimated existence range of each of the estimated first to Nth previous vehicle locations can be represented as an error variance of each of the estimated first to Nth previous vehicle locations relative to the corresponding one of the estimated first to Nth previous vehicle locations.

In step S20, the CPU 71 additionally projects the error variance of each of the estimated first to Nth previous vehicle locations onto the corresponding one of the estimated first to Nth previous vehicle locations as a probabilistic distribution along a width direction of a lane of the own vehicle, i.e., a direction perpendicular to the traveling direction of the own vehicle; the lane of the own vehicle will be referred to as an own-vehicle lane. This enables an existence probability of each of the estimated first to Nth previous vehicle locations in the lane width direction to be expressed as a corresponding existence probability distribution centered around the corresponding one of the estimated first to Nth previous vehicle locations.

For example, the CPU 71 according to the exemplary embodiment is programmed to model the error variance of each of the estimated first to Nth previous vehicle locations, which may be due to error factors of the corresponding one of the odometry information sets, as a normal probability distribution.

That is, when a selected point in the normal probability distribution, i.e., the estimated existence range, of each of the estimated first to Nth previous vehicle locations is positioned at the corresponding one of the estimated first to Nth previous vehicle locations, the selected point has a peak, i.e., a highest existence probability, in the normal probability distribution. When a selected point in the normal probability distribution, i.e., the estimated existence range, of each of the estimated first to Nth previous vehicle locations is positioned to be farther away from the corresponding one of the estimated first to Nth previous vehicle locations, the selected point has a smaller existence probability in the normal probability distribution.

Next, the CPU 71 determines at least one adjacent lane probability map in step S30.

Specifically, the CPU 71 defines, for each of the estimated first to Nth previous vehicle locations, a location of an adjacent lane, i.e., a right lane relative to the own vehicle, in the lane width direction in step S30. That is, the CPU 71 defines, for each of the estimated first to Nth previous vehicle locations, both end locations of respective near-side and far-side lane markings in the lane width direction in step S30.

Then, the CPU 71 performs a projection of the error variance of each of the estimated first to Nth previous vehicle locations onto (i) the end location of the near-side lane making for the corresponding one of the estimated first to Nth previous vehicle locations and onto (ii) the end location of the far-side lane making for the corresponding one of the estimated first to Nth previous vehicle locations in step S30. This projection calculates an inner (near-side) existence probability distribution of the near-side lane marking for each of the estimated first to Nth previous vehicle locations, and calculates an outer (far-side) existence probability distribution of the far-side lane marking for each of the estimated first to Nth previous vehicle locations.

More specifically, the near-side lane marking, in other words, an inner lane marking, which partitions the adjacent lane, is located to be closer to the own vehicle than the far-side lane marking is. Similarly, the far-side lane marking, in other words, an outer lane marking, which partitions the adjacent lane, is located to be farther away from the own vehicle than the near-side lane marking is.

That is, in step S30, the CPU 71 defines, for each of the estimated first to Nth previous vehicle locations, an estimated value of the location of the inner lane marking and an estimated value of the location of the outer-side lane marking. The location of the inner lane marking for each of the estimated first to Nth previous vehicle locations will be referred to as an inner lane-marking location for the corresponding one of the estimated first to Nth previous vehicle locations. The estimated value of each of the inner lane-marking locations will be referred to as an estimated inner lane-marking location. Similarly, the location of the outer lane marking for each of the estimated first to Nth previous vehicle locations will be referred to as an outer lane-marking location for the corresponding one of the estimated first to Nth previous vehicle locations. The estimated value of each of the outer lane-marking locations will be referred to as an estimated outer lane-marking location.

Then, in step S30, the CPU 71 projects the error variance of each of the estimated first to Nth previous vehicle locations onto both (i) a corresponding one of the estimated inner lane-marking locations and (ii) a corresponding one of the estimated outer lane-marking locations. This determines the inner existence probability distribution for each inner lane-marking location in the lane width direction, and the outer existence probability distribution for each outer lane-marking location in the lane width direction.

That is, for each inner lane-marking location, when a selected point in the normal probability distribution, i.e., the inner existence probability distribution, is positioned at the corresponding estimated inner lane-marking location, the selected point has a peak, i.e., a highest existence probability, in the normal probability distribution. When a selected point in the normal probability distribution, i.e., the inner existence probability distribution, is positioned to be farther away from the corresponding estimated inner lane-marking location, the selected point has a smaller existence probability in the normal probability distribution.

Similarly, for each outer lane-marking location, when a selected point in the normal probability distribution, i.e., the outer existence probability distribution, is positioned at the corresponding estimated outer lane-marking location, the selected point has a peak, i.e., a highest existence probability, in the normal probability distribution. When a selected point in the normal probability distribution, i.e., the outer existence probability distribution, is positioned to be farther away from the corresponding estimated outer lane-marking location, the selected point has a smaller existence probability in the normal probability distribution.

This results in

1. The inner existence probability distributions for the respective inner lane-marking locations, each of which corresponds to one of the first to Nth previous control cycles, being obtained 2. The outer existence probability distributions for the respective outer lane-marking locations, each of which corresponds to one of the first to Nth previous control cycles being obtained Additionally, in step S30, the CPU 71 extracts, from each of the inner existence probability distributions, at least one point; the extracted at least one point of each of the inner existence probability distributions has a predetermined existence probability, i.e., a same probability.

For example, the CPU 71 extracts, from each of the inner existence probability distributions, first to third points. The first points extracted from the respective inner existence probability distributions have a same existence probability P1, the second points extracted from the respective inner existence probability distributions have a same existence probability P2, and the third points extracted from the respective inner existence probability distributions have a same existence probability P3.

Similarly, in step S30, the CPU 71 extracts, from each of the outer existence probability distributions, at least one point; the extracted at least one point of each of the outer existence probability distributions has a predetermined existence probability, i.e., a same probability.

For example, the CPU 71 extracts, from each of the outer existence probability distributions, first to third points. The first points extracted from the respective outer existence probability distributions have the same existence probability P1, the second points extracted from the respective outer existence probability distributions have the same existence probability P2, and the third points extracted from the respective outer existence probability distributions have the same existence probability P3.

Then, in step S30, the CPU 71 links the extracted points from the respective inner existence probability distributions to each other, and links the extracted points from the respective outer existence probability distributions to each other. This results in determination of the at least one adjacent lane probability map in step S30.

If the CPU 71 extracts, from each of the inner existence probability distributions, the first to third points, and extracts, from each of the outer existence probability distributions, the first to third points, first to third adjacent lane probability maps are obtained. The first adjacent lane probability map shows a region in which the adjacent lane, i.e., the right lane, is located at the existence probability P1, the second adjacent lane probability map shows a region in which the adjacent lane, i.e., the right lane, is located at the existence probability P2. The third adjacent lane probability map shows a region in which the adjacent lane, i.e., the right lane, is located at the existence probability P3.

Specifically, each of the first to third adjacent lane maps shows a corresponding one of the existence probabilities P1 to P3 of the adjacent lane, i.e., the right lane.

In other words, the first adjacent lane map shows the existence probability P1 of an object existing in the adjacent lane if the object exists in the region defined by the first adjacent lane map, and the second adjacent lane map shows the existence probability P2 of an object existing in the adjacent lane if the object exists in the region defined by the second adjacent lane map. Similarly, the third adjacent lane map shows the existence probability P3 of an object existing in the adjacent lane if the object exists in the region defined by the third adjacent lane map.

The existence probabilities P1 to P3 according to the exemplary embodiment may be respectively set to 100% (1.0), 70% (0.7), and 30% (0.3).

For example, the first adjacent lane map is defined by a first inner boundary line and a first outer boundary line.

The first inner boundary line is defined by connecting (i) a point in the inner existence probability distribution, which has $1\sigma$, i.e., the existence probability of 68.3%, for the estimated first previous vehicle location, (ii) a point in the inner existence probability distribution, which has $1\sigma$, i.e., the existence probability of 68.3%, for the estimated second previous vehicle location, . . . , and (iii) a point in the inner existence probability distribution, which has $1\sigma$, i.e., the existence probability of 68.3%, for the estimated Nth previous vehicle location. Similarly, the first outer boundary line is defined by connecting (i) a point in the outer existence probability distribution, which has $1\sigma$, i.e., the existence probability of 68.3%, for the estimated first previous vehicle location, (ii) a point in the outer existence probability distribution, which has $1\sigma$, i.e., the existence probability of 68.3%, for the estimated second previous vehicle location, . . . , and (iii) a point in the outer existence probability distribution, which has $1\sigma$, i.e., the existence probability of 68.3%, for the estimated Nth previous vehicle location.

Additionally, the second adjacent lane map is defined by a second inner boundary line and a second outer boundary line.

The second inner boundary line is defined by connecting (i) a point in the inner existence probability distribution, which has $2\sigma$, i.e., the existence probability of 95.5%, for the estimated first previous vehicle location, (ii) a point in the inner existence probability distribution, which has $2\sigma$, i.e., the existence probability of 95.5%, for the estimated second previous vehicle location, . . . , and (iii) a point in the inner existence probability distribution, which has $2\sigma$, i.e., the existence probability of 95.5%, for the estimated Nth previous vehicle location. Similarly, the second outer boundary line is defined by connecting (i) a point in the outer existence probability distribution, which has $2\sigma$, i.e., the existence probability of 95.5%, for the estimated first previous vehicle location, (ii) a point in the outer existence probability distribution, which has $2\sigma$, i.e., the existence probability of 95.5%, for the estimated second previous vehicle location, . . . , and (iii) a point in the outer existence probability distribution, which has $2\sigma$, i.e., the existence probability of 95.5%, for the estimated Nth previous vehicle location.

Moreover, the third adjacent lane map is defined by a third inner boundary line and a third outer boundary line.

The third inner boundary line is defined by connecting (i) a point in the inner existence probability distribution, which has $3\sigma$, i.e., the existence probability of 99.7%, for the estimated first previous vehicle location, (ii) a point in the inner existence probability distribution, which has $3\sigma$, i.e., the existence probability of 99.7%, for the estimated second previous vehicle location, . . . , and (iii) a point in the inner existence probability distribution, which has $3\sigma$, i.e., the existence probability of 99.7%, for the estimated Nth previous vehicle location. Similarly, the third outer boundary line is defined by connecting (i) a point in the outer existence probability distribution, which has 36, i.e., the existence probability of 99.7%, for the estimated first previous vehicle location, (ii) a point in the outer existence probability distribution, which has 36, i.e., the existence probability of 99.7%, for the estimated second previous vehicle location, . . . , and (iii) a point in the outer existence probability distribution, which has 36, i.e., the existence probability of 99.7%, for the estimated Nth previous vehicle location.

Following the operation in step S30, the CPU 71 determines whether there is a situation where the CPU 71 enables measurement of a wall located on the right side of the own vehicle in step S40. Specifically, the CPU 71 analyzes the distance D, relative speed Vr, and the azimuth θ of one or more objects measured by each of the first to Nth previous control cycles, to thereby track one or more same objects included in the one or more objects measured by each of the first to Nth previous control cycles in step S40. Then, the CPU 71 determines whether a vehicle, i.e., a right-side vehicle, is traveling in parallel to the own vehicle on the right side of the own vehicle in step S40.

If determining that a right-side vehicle is traveling on the right side of the own vehicle, the CPU 71 determines that there is not a situation where the CPU 71 enables measurement of a wall located on the right side of the own vehicle (NO in step S40).

Otherwise, if determining that no right-side vehicle is traveling on the right side of the own vehicle, the CPU 71 determines that there is a situation where the CPU 71 enables measurement of a wall located on the right side of the own vehicle (YES in step S40).

In response to the affirmative determination in step S40, the CPU 71 determines whether measurement of a wall located on the right side of the own vehicle has succeeded in step S50.

Specifically, for measuring the wall located on the right side of the own vehicle, the CPU 71 performs frequency analysis processing, such as FFT processing, for each of the up-beat signals of the corresponding receive antenna 51 to accordingly calculate an up-beat power spectrum of each of the up-beat signals. Similarly, the CPU 71 performs the frequency analysis processing, such as the FFT processing, for each of the down-beat signals of the corresponding receive antenna 51 to accordingly calculate a down-beat power spectrum of each of the down-beat signals.

Each of the up-beat and down-beat power spectrums has power levels at respective frequency bins. Each frequency bin of each of the up-beat and down-beat power spectrums represents a frequency range and resolution on a frequency axis of the corresponding one of the up-beat and down-beat power spectrums.

In step S50, the CPU 71 averages the up-beat power spectrums of the respective up-beat signals of the respective receive antennas 51 to accordingly calculate an up-beat average power spectrum. Similarly, in step S50, the CPU 71 averages the down-beat power spectrums of the respective down-beat signals of the respective receive antennas 51 to accordingly calculate a down-beat average power spectrum.

Then, the CPU 71 extracts, from each of the up-beat and down-beat average power spectrums, plural local peaks within a predetermined peak extraction frequency range in step S50. For example, the CPU 71 extracts, from each of the up-beat and down-beat average power spectrums, three local peaks within the predetermined peak extraction frequency range in step S50; one of the three local peaks has the highest power level in the three local peaks, one of the remaining two local peaks has a power level higher than the other of the remaining two local peaks.

In step S50, the CPU 71 performs, for each of the up-beat and down-beat average power spectrums, a known azimuth expansion algorithm, such as a known MUSIC algorithm, a known DBF algorithm, or a known CAPON algorithm, based on the extracted peaks for the corresponding one of the up-beat and down-beat average power spectrums to accordingly obtain an up-beat azimuth expansion spectrum and a down-peak expansion spectrum.

Then, the CPU 71 extracts, from each of the up-beat azimuth expansion spectrum and down-peak expansion spectrum, plural azimuth peaks, and performs a pair matching task between the first set of the plural azimuth peaks extracted from the up-beat azimuth expansion spectrum and the second set of the plural azimuth peaks extracted from the down-beat azimuth expansion spectrum in accordance with predetermined features of walls in step S50.

When determining, based on the pair-matching task, that at least one pair of a frequency peak, i.e., an azimuth peak, extracted from the up-beat azimuth expansion spectrum and a frequency peak, i.e., an azimuth peak, extracted from the down-beat azimuth expansion spectrum is established between the first set of the plural azimuth peaks extracted from the up-beat azimuth expansion spectrum and the second set of the plural azimuth peaks extracted from the down-beat azimuth expansion spectrum, the CPU 71 determines that measurement of a wall located on the right side of the own vehicle has succeeded (YES in step S50). Otherwise, when determining, based on the pair-matching task, that no azimuth-peak pairs are established between the first set of the plural frequency peaks extracted from the up-beat azimuth expansion spectrum and the second set of the plural frequency peaks extracted from the down-beat azimuth expansion spectrum, the CPU 71 determines that measurement of a wall located on the right side of the own vehicle has not succeeded (NO in step S50).

For example, the CPU 71 determines whether at least one pair of an azimuth peak extracted from the up-beat azimuth expansion spectrum and an azimuth peak extracted from the down-beat azimuth expansion spectrum is established in accordance with the following first to third pair-matching determination conditions, and determined that at least one pair of an azimuth peak extracted from the up-beat azimuth expansion spectrum and an azimuth peak extracted from the down-beat azimuth expansion spectrum is established upon determination that all the first to third pair-matching determination conditions are satisfied.

The first pair-matching determination condition is that the frequency of an azimuth peak extracted from the up-beat azimuth expansion spectrum is substantially identical to that of an azimuth peak extracted from the down-beat azimuth expansion spectrum. The first pair-matching determination condition is previously determined based on the fact that a wall located just beside the own vehicle has no relative speed relative to the own vehicle in the lateral direction.

The second pair-matching determination condition is that the azimuth of an azimuth peak extracted from the up-beat azimuth expansion spectrum is substantially identical to that of an azimuth peak extracted from the down-beat azimuth expansion spectrum. The second pair-matching determination condition is previously determined based on the fact that a wall to be measured by the CPU 71 is located just beside the own vehicle.

The third pair-matching determination condition is that the power level of an azimuth peak extracted from the up-beat azimuth expansion spectrum is substantially identical to that of an azimuth peak extracted from the down-beat azimuth expansion spectrum. The third pair-matching determination condition is previously determined based on the fact that the power level of one received signal Sr resulting from reflection of the transmitted radar-wave signal by an object is substantially identical to that of another received signal Sr resulting from reflection of the transmitted radar-wave signal by the same object.

When determining that measurement of a wall located on the right side of the own vehicle has succeeded (YES in step S50), the CPU 71 calculates, as an instantaneous wall distance value, the distance D based on the established at least one pair of an azimuth peak extracted from the up-beat azimuth expansion spectrum and an azimuth peak extracted from the down-beat azimuth expansion spectrum in step S60. Then, the CPU 71 stores the instantaneous wall distance value in a wall-distance variable WD stored in the RAM 73 in step S60.

Next, the CPU 71 increments the count of a continuous measurement counter C3 stored in the RAM 73 by 1 in step S70. The wall profile calculation routine thereafter proceeds to step S210.

Figure 4:
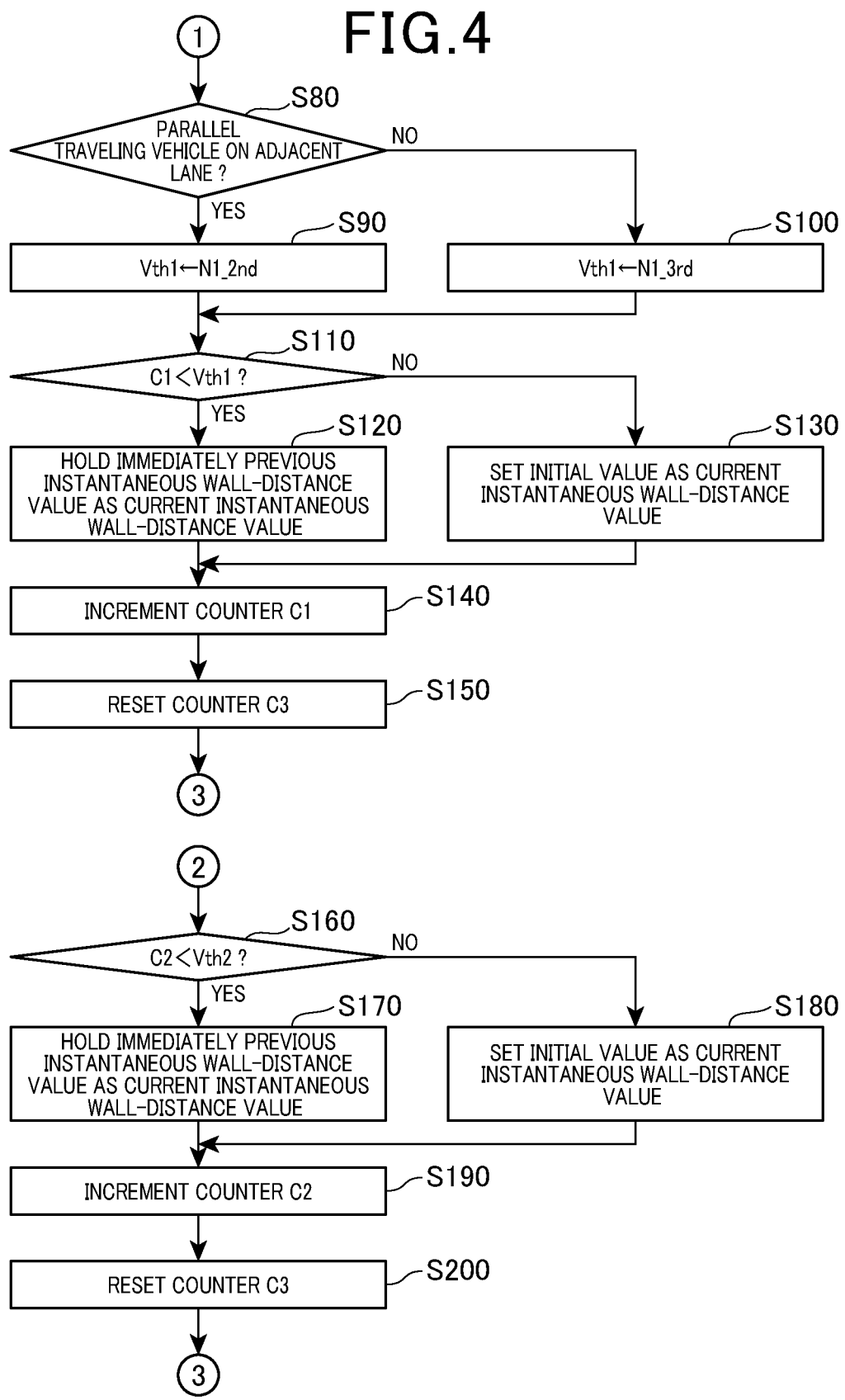
FIG. 4 is a flowchart illustrating a second part of the wall profile calculation routine.

Otherwise, in response to the negative determination in step S40, i.e., in response to determination that a right-side vehicle is traveling on the right side of the own vehicle, the CPU 71 determines whether there is a right-side parallel traveling vehicle on an adjacent right-side lane located on the right side of the own vehicle in step S80 of FIG. 4.

For example, the CPU 71 determines, in step S80, whether there is a right-side parallel traveling vehicle on the right side of the own vehicle in accordance with (i) the measured distance D and an azimuth angle θ of an object corresponding the right-side vehicle and at least one of (ii) the at least one adjacent lane probability map determined in step S30 and (iii) the trajectory of the right-side vehicle that has been measured by the CPU 71.

In response to determination that there is a right-side parallel traveling vehicle on an adjacent right-side lane located on the right side of the own vehicle (YES in step S80), the CPU 71 stores a predetermined second lane determination value N1_2nd in a first threshold variable Vth1 stored in the RAM 73 in step S90. The wall profile calculation routine thereafter proceeds to step S110.

Otherwise, in response to determination that there is no right-side parallel traveling vehicle on an adjacent right-side lane located on the right side of the own vehicle (NO in step S80), the CPU 71 stores a predetermined third lane determination value N1_3nd, which is larger than the second lane determination value N1_2nd, in the first threshold variable Vth1 included in the RAM 73 in step S100. The wall profile calculation routine thereafter proceeds to step S110.

In step S110, the CPU 71 determines whether the count of a wall unmeasurable counter C1 stored in the RAM 73 is smaller than the value stored in the first threshold variable Vth1. In response to determination that the count of the wall unmeasurable counter C1 is smaller than the value stored in the first threshold variable Vth1 (YES in step S110), the CPU 71 performs an extrapolation task of holding the value, which was calculated in the immediately previous control cycle and stored in the wall-distance value variable WD as an additional instantaneous wall-distance value in the current control cycle in step S120. The wall profile calculation routine thereafter proceeds to step S140. That is, the CPU 71 holds the value of the wall-distance variable WD stored in the first previous control cycle.

Otherwise, in response to determination that the count of the wall unmeasurable counter C1 is larger than or equal to the value stored in the first threshold variable Vth1 (NO in step S110), the CPU 71 stores a predetermined initial value in the wall-distance variable WD in step S130. The wall profile calculation routine thereafter proceeds to step S140. For example, the initial value is set to a value equivalent to 15 meters.

In step S140, the CPU 71 increments the count of the wall unmeasurable counter C1 by 1. Next, the CPU 71 resets the count of the continuous measurement counter C3 to 0 in step S150. The wall profile calculation routine thereafter proceeds to step S210.

Otherwise, in response to determination that measurement of a wall located on the right side of the own vehicle has not succeeded (NO in step S50), the CPU 71 determines whether the count of a lost wall counter C2 stored in the RAM 73 is smaller than a value stored in a second threshold variable Vth2 stored in the RAM 73 in step S160. In response to determination that the count of the lost wall counter C2 is smaller than the value stored in the second threshold variable Vth2 (YES in step S160), the CPU 71 performs the extrapolation task of holding the value, which was calculated in the immediately previous control cycle and stored in the wall-distance value variable WD as an additional instantaneous wall-distance value in the current control cycle in step S170. The wall profile calculation routine thereafter proceeds to step S190. That is, the CPU 71 holds the value of the wall-distance variable WD stored in the first previous control cycle.

Otherwise, in response to determination that the count of the lost wall counter C2 is larger than or equal to the value stored in the second threshold variable Vth2 (NO in step S160), the CPU 71 stores the predetermined initial value in the wall-distance variable WD in step S180. The wall profile calculation routine thereafter proceeds to step S190.

In step S190, the CPU 71 increments the count of the lost wall counter C2 by 1. Next, the CPU 71 resets the count of the continuous measurement counter C3 to 0 in step S200. The wall profile calculation routine thereafter proceeds to step S210.

In step S210, the CPU 71 performs, as illustrated in FIG. 3, a constant determination subroutine.

Next, the following describes the constant determination subroutine.

Figure 5:
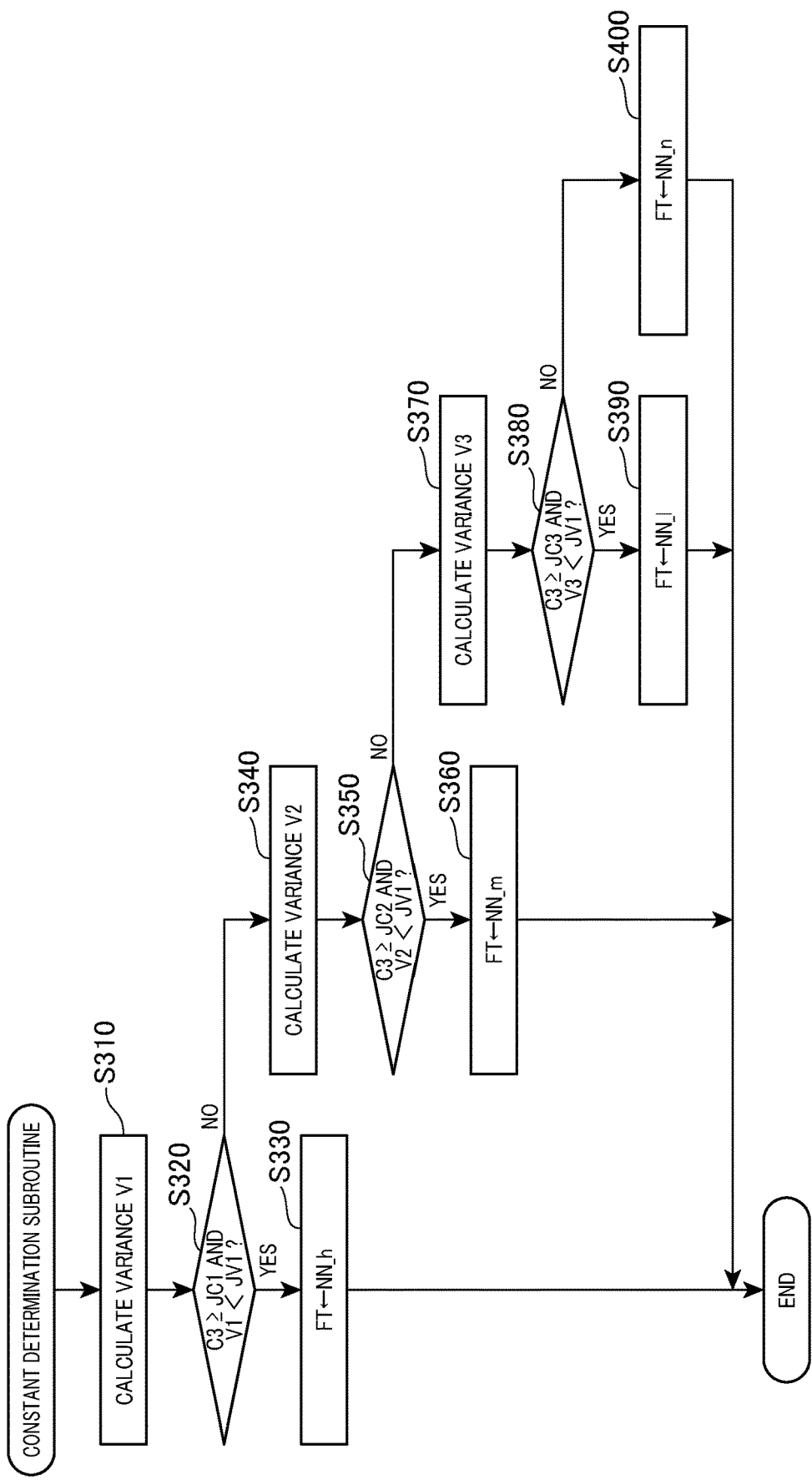
FIG. 5 is a flowchart illustrating a constant determination subroutine.

When starting the constant determination subroutine in step S210 of FIG. 3, the CPU 71 calculates the variance of the instantaneous wall distance values that have been calculated in recent control cycles whose number corresponds to a predetermined high reliability determination number JC1 of, for example, 20 in step S310 of FIG. 5. That is, the CPU 71 calculates the variance of the instantaneous wall distance values that have been calculated during, as a continuous measurement period, the latest 20 control cycles in response to determination that the wall has been continuously measured for the latest 20 control cycles in step S310. Then, the CPU 71 stores the calculated variance in a variance variable V1 stored in the RAM 73 in step S310.

Next, the CPU 71 determines whether the count of the continuous measurement counter C3 is higher than or equal to the high reliability determination number JC1 and the value of the variance variable V1 is smaller than a predetermined variance determination threshold JV1 in step S320. The variance determination threshold JV1 is set to a value equivalent to 0.1 m². The reason why the constant determination subroutine uses the variance is to reduce the computational burden of the CPU 71, and therefore the constant determination subroutine preferably uses the standard deviation in place of the variance.

In response to determination that the count of the continuous measurement counter C3 is higher than or equal to the high reliability determination number JC1 and the value of the variance variable V1 is smaller than the predetermined variance determination threshold JV1 (YES in step S320), the CPU 71 stores a predetermined high reliability determination constant NN_h in a filter constant variable FT stored in the RAM 73 in step S330, and thereafter terminates the constant determination subroutine, returning to the wall profile calculation routine. The predetermined high reliability determination constant NN_h according to the exemplary embodiment is set to a value equivalent to, for example, 0.9.

Otherwise, in response to determination that the count of the continuous measurement counter C3 is lower than the high reliability determination number JC1 and/or the value of the variance variable V1 is larger than or equal to the predetermined variance determination threshold JV1 (NO in step S320), the CPU 71 performs an operation in step S340.

Specifically, the CPU 71 calculates, in step S340, the variance of the instantaneous wall distance values that has been respectively measured in recent control cycles whose number corresponds to a predetermined middle reliability determination number JC2 of, for example, 10. That is, the CPU 71 calculates the variance of the instantaneous wall distance values that has been respectively measured in the latest 10 control cycles in step S340. Then, the CPU 71 stores the calculated variance in a variance variable V2 stored in the RAM 73 in step S340.

Next, the CPU 71 determines whether the count of the continuous measurement counter C3 is higher than or equal to the middle reliability determination number JC2 and the value of the variance variable V2 is smaller than the predetermined variance determination threshold JV1 in step S350.

In response to determination that the count of the continuous measurement counter C3 is higher than or equal to the middle reliability determination number JC1 and the value of the variance variable V2 is smaller than the predetermined variance determination threshold JV1 (YES in step S350), the CPU 71 stores a predetermined middle reliability determination constant NN_m in the filter constant variable FT stored in the RAM 73 in step S360, and thereafter terminates the constant determination subroutine, returning to the wall profile calculation routine. The predetermined middle reliability determination constant NN_m according to the exemplary embodiment is set to a value equivalent to, for example, 0.7.

Otherwise, in response to determination that the count of the continuous measurement counter C3 is lower than the middle reliability determination number JC2 and/or the value of the variance variable V2 is larger than or equal to the predetermined variance determination threshold JV1 (NO in step S350), the CPU 71 performs an operation in step S370.

Specifically, the CPU 71 calculates, in step S370, the variance of the instantaneous wall distance values that has been respectively measured in recent control cycles whose number corresponds to a predetermined low reliability determination number JC3 of, for example, 5. That is, the CPU 71 calculates the variance of the instantaneous wall distance values that has been respectively measured in the latest 5 control cycles in step S370. Then, the CPU 71 stores the calculated variance in a variance variable V3 stored in the RAM 73 in step S370.

Next, the CPU 71 determines whether the count of the continuous measurement counter C3 is higher than or equal to the low reliability determination number JC3 and the value of the variance variable V3 is smaller than the predetermined variance determination threshold JV1 in step S380.

In response to determination that the count of the continuous measurement counter C3 is higher than or equal to the low reliability determination number JC1 and the value of the variance variable V3 is smaller than the predetermined variance determination threshold JV1 (YES in step S380), the CPU 71 stores a predetermined low reliability determination constant NN_1 in the filter constant variable FT stored in the RAM 73 in step S390, and thereafter terminates the constant determination subroutine, returning to the wall profile calculation routine. The predetermined low reliability determination constant NN_1 according to the exemplary embodiment is set to a value equivalent to, for example, 0.3.

Otherwise, in response to determination that the count of the continuous measurement counter C3 is lower than the middle reliability determination number JC2 and/or the value of the variance variable V3 is larger than or equal to the predetermined variance determination threshold JV1 (NO in step S380), the CPU 71 performs an operation in step S400.

In step S400, the CPU 71 stores a predetermined normal reliability determination constant NN_n in the filter constant variable FT stored in the RAM 73, and thereafter terminates the constant determination subroutine, returning to the wall profile calculation routine. The predetermined normal reliability determination constant NN_n according to the exemplary embodiment is set to a value equivalent to, for example, 0.3.

Returning to the wall profile calculation routine, the CPU 71 calculates, in step S220, a wall filter value.

Specifically, the CPU 71 filters the instantaneous wall distance value, which will be referred to as WD(N), stored in the wall-distance variable WD in the current control cycle in accordance with the following expression (3) to thereby calculate a filtered wall distance value FV(N):

$$FV(N) = WD(N) \times FT + FV(N-1) \times (1-FT) \qquad (3)$$

Then, the CPU 71 stores the filtered wall distance value FV(N) in the current control cycle in the RAM 73. That is, before the operation in step S220 of the current control cycle is carried out, the filtered wall distance values FV(N), FV(N-1), ..., FV(1), which have been calculated in the operations in step S220, are stored in the RAM 73. Thus, after the operation in step S220 of the current control cycle is carried out, the CPU 71 updates the filtered wall distance value FV(N), FV(N-1), ..., FV(1) to filtered wall distance values FV(N-1), FV(N-2), ..., and FV(0) in the RAM 73, which have been calculated in the first previous control cycle, ..., and the Nth previous control cycle, and stores the filtered wall distance value FV(N) in the RAM 73.

Following the operation in step S220, the CPU 71 performs a wall-profile value calculation subroutine in step S230.

Next, the following describes the wall-profile value calculation subroutine in step S230.

Figure 6:
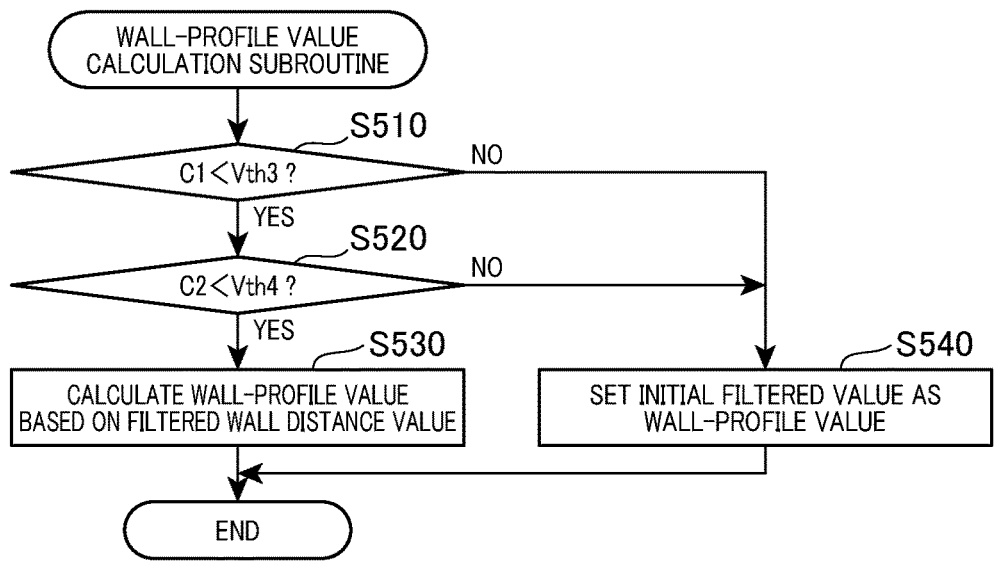
FIG. 6 is a flowchart illustrating a wall-profile value calculation subroutine.

When starting the wall-profile value calculation subroutine, the CPU 71 determines whether the count of the wall unmeasurable counter C1 stored in the RAM 73 is smaller than a value stored in a third threshold variable Vth3 in step S510 of FIG. 6. The third threshold variable Vth3 is set to be larger than the first threshold variable Vth1.

In response to determination that the count of the wall unmeasurable counter C1 stored in the RAM 73 is smaller than the value stored in the third threshold variable Vth3 (YES in step S510), the CPU 71 determines whether the count of the lost wall counter C2 stored in the RAM 73 is smaller than a value stored in a fourth threshold variable Vth4 in step S520. The fourth threshold variable Vth4 is set to be larger than the second threshold variable Vth2.

In response to determination that the count of the lost wall counter C2 stored in the RAM 73 is smaller than the value stored in a fourth threshold variable Vth4 (YES in step S520), the CPU 71 calculates a wall-profile value based on the filtered wall distance value FV in step S530, and thereafter terminates the wall-profile value calculation subroutine, returning to the wall profile calculation routine.

Figure 7:
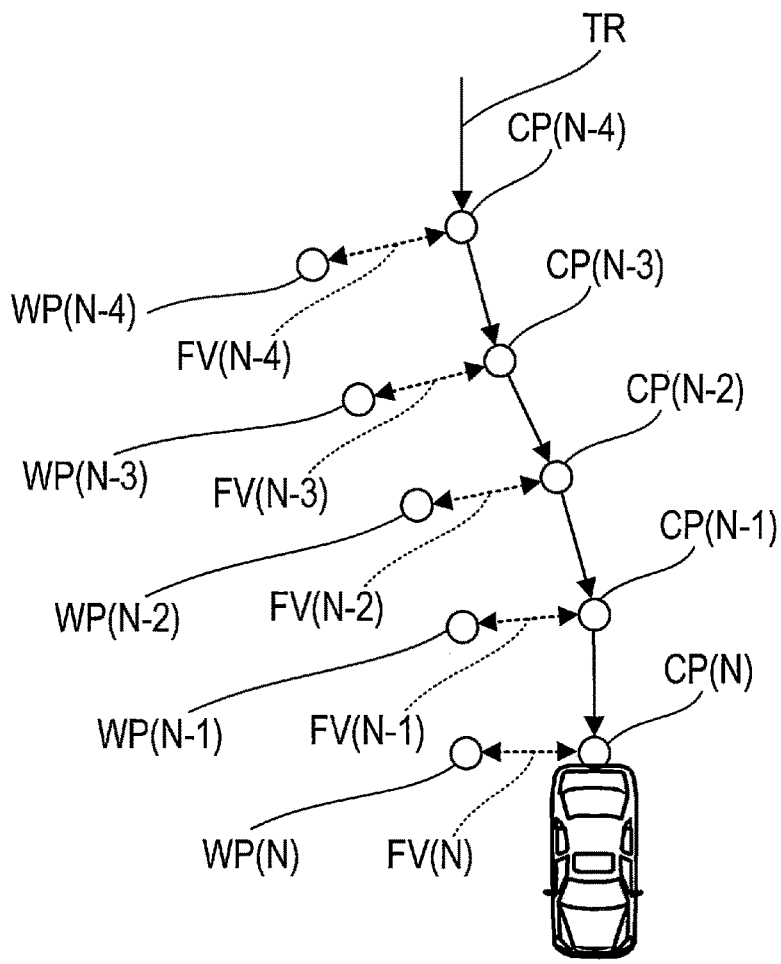
FIG. 7 is a diagram illustrating how to calculate wall-profile values.

Specifically, as described above, the CPU 71 has calculated the estimated current vehicle location, the estimated first previous vehicle location, . . . , and the estimated Nth previous vehicle location, which constitute the trajectory, to which reference character TR is assigned in FIG. 7, of the own vehicle in step S20. In addition, reference characters CP(N), CP(N-1), CP(N-2), . . . , CP(1), and CP(0) are respectively assigned to the estimated current vehicle location, the estimated first previous vehicle location, . . . , the estimated (N-1)th previous vehicle location, and the estimated Nth previous vehicle location will be referred to as CP(N), CP(N-1), CP(N-2), . . . , CP(1), and CP(0) (see FIG. 7).

Then, the CPU 71 determines a wall position WP(N), which is located on the right side of the estimated current vehicle location CP(N) and separated away from the estimated current vehicle location CP(N) by the filtered wall distance value FV(N) in the lateral direction perpendicular to the forward direction.

Similarly, the CPU 71 determines a wall position WP(N-1), which is located on the right side of the estimated first previous vehicle location CP(N-1) and separated away from the estimated first previous vehicle location CP(N-1) by the filtered wall distance value FV(N-1) in the lateral direction, . . . , and determines the position of a wall position WP(0), which is located on the right side of the estimated Nth previous vehicle location CP(0) and separated away from the estimated Nth previous vehicle location CP(0) by the filtered wall distance value FV(0) in the lateral direction.

The above wall positions WP(N), WP(N-1), . . . , and WP(0) serve as wall-profile values WP(N), WP(N-1), . . . , and WP(0).

Otherwise, as illustrated in FIG. 6, in response to determination that the count of the lost wall counter C2 stored in the RAM 73 is larger than or equal to the value stored in the fourth threshold variable Vth4 (NO in step S520), the wall-profile value calculation subroutine proceeds to step S540.

Similarly, in response to determination that the count of the wall unmeasurable counter C1 stored in the RAM 73 is larger than or equal to the value stored in the third threshold variable Vth3 (NO in step S510), the wall-profile value calculation subroutine proceeds to step S540.

In step S540, the CPU 71 sets predetermined initial filtered wall distance values as the respective filtered wall distance values FV(N), FV(N-1), FV(N-2), . . . , FV(1), and FV(0) in the RAM 73 in step S540. Then, the CPU 71 determines the wall position WP(N), which is located on the right side of the estimated current vehicle location CP(N) and separated away from the estimated current vehicle location CP(N) by the initial filtered wall distance value FV(N) in the lateral direction, . . . , and determines the position of a wall position WP(0), which is located on the right side of the estimated Nth previous vehicle location CP(0) and separated away from the estimated Nth previous vehicle location CP(0) by the initial filtered wall distance value FV(0) in the lateral direction in step S540. Thereafter, the CPU 71 terminates the wall-profile value calculation subroutine, returning to the wall profile calculation routine.

Returning to the wall profile calculation routine, the CPU 71 calculates an existence probability, i.e., an existence probability distribution, of at least one target object existing in the adjacent lane, i.e., the right lane, relative to the own vehicle in step S240.

Specifically, the CPU 71 calculates the existence probability of the at least one target object in the adjacent lane in accordance with the at least one adjacent lane probability map determined in step S30 and the wall-profile values WP(N), WP(N-1), . . . , and WP(0) calculated in step S230.

Basically, the CPU 71 calculates the existence probability distribution of the at least one target object in the adjacent lane in accordance with the at least one adjacent lane probability map.

Additionally, if a profile of the wall-profile values WP(N), WP(N-1), . . . , and WP(0) is located to partition the at least one adjacent lane probability map into an inside region and an outside region, the CPU 71 can uniformly set the existence probabilities in the outside region of the at least one adjacent lane probability map to 0, thus setting the existence probability of the at least one target object in the outside region of the at least one adjacent lane probability map to 0. Alternatively, the CPU 71 can delete one or more target objects detected in the outside region from the profile of the wall-profile values WP(N), WP(N-1), . . . , and WP(0).

Following the operation in step S240, the CPU 71 determines whether the at least one target is located in the adjacent lane in step S250. Specifically, the CPU 71 determines whether the at least one target is located in the adjacent lane in accordance with (i) the existence probability of the at least one target object in the adjacent lane and (ii) the location information, i.e., the observation information, of the at least one target measured by the radar device 11.

The CPU 71 can be configured to calculate, as the existence probability of the at least one target object in the adjacent lane in the current control cycle, a filtered existence probability of the at least one target object in the adjacent lane in accordance with (i) An actually calculated value of the existence probability of the at least one target object in the adjacent lane in the current control cycle (ii) The product of a forgetting factor and the actually calculated value of the existence probability of the at least one target object in the adjacent lane in the first previous control cycle That is, the filtered existence probability of the at least one target object in the adjacent lane can be represented by a previously designed expression similar to the expression (3).

For example, if the filtered existence probability of the at least one target object in the adjacent lane is more than or equal to 70% (0.7), the CPU 71 determines that the at least one target is located in the adjacent lane. Otherwise, if the filtered existence probability of the at least one target object in the adjacent lane is less than 70% (0.7), the CPU 71 determines that the at least one target is not located in the adjacent lane.

Following the operation in step S250, the CPU 71 performs a warning target extraction task in step S260. Specifically, upon determination that the at least one target is located in the adjacent lane in step S250, the CPU 71 recognizes the positional relationship between the at least one target and the own vehicle. Then, the CPU 71 determines whether the positional relationship between the at least one target and the own vehicle satisfies a predetermined condition in step S250. In response to determination that the positional relationship between the at least one target and the own vehicle satisfies the predetermined condition, the CPU 71 determines that the at least one target object is at least one warning target, and extracts the at least one target object as the at least one warning target in step S260.

The predetermined condition represents, for example, a condition that at least one of the following first and second extraction conditions is satisfied.

The first extraction condition is that the relative distance between the own vehicle and the at least one target object is smaller than or equal to a predetermined threshold distance.

The second extraction condition is that the amount of time required for the at least one target object to arrive at the own vehicle, which can be calculated based on the relative speed between the at least one target object and the own vehicle, is smaller than or equal to a predetermined threshold amount of time.

Following the operation in step S260, the CPU 71 performs a warning output task upon extraction of the at least one target object as the at least one warning target in step S270. Specifically, the CPU 71 outputs, to the cruise-assist ECU 2, a warning instruction that instructs the cruise-assist ECU 2 to output a warning indicative of the existence of the at least one warning target. In response to receiving the warning instruction, the cruise-assist ECU 2 instructs the warning device 4 to output a warning about information represented by the warning instruction. After completion of the warning output task, the CPU 71 terminates the wall profile calculation routine.

The wall profile calculation routine carried out by the CPU 71 of the radar device 12 is substantially identical to that carried out by the CPU 71 of the radar device 11 set forth above except that the CPU 71 of the radar device 12 aims to measure a left-side wall located at the left side of the own vehicle. For this reason, descriptions of the wall profile calculation routine carried out by the CPU 71 of the radar device 12 are omitted.

Next, the following describes an extrapolation frequency determination routine carried out by the CPU 71 of the radar device 11 for measuring the right-side wall located at the right side of the own vehicle. The CPU 71 is programmed to periodically perform the extrapolation frequency determination routine. One cycle of the periodically performed extrapolation frequency determination routine will be referred to as a determination cycle associated with the control cycle.

Figure 8:
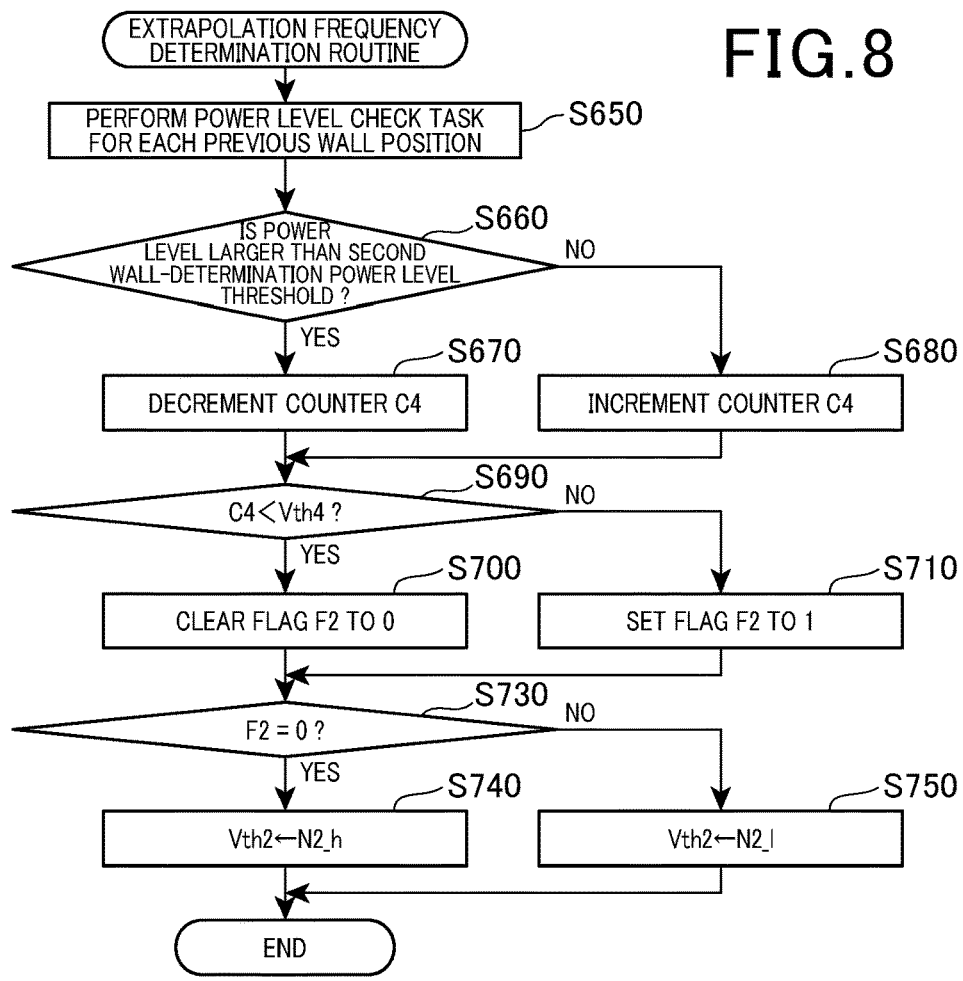
FIG. 8 is a flowchart illustrating an extrapolation frequency determination routine.

When starting a current determination cycle of the extrapolation frequency determination routine, the CPU 71 performs, in step S650 of FIG. 8, a power level check task for each of the wall positions WP(N−1), WP(N−2), . . . , WP(1) obtained by the previous control cycles of the wall profile calculation routine.

Specifically, the CPU 71 calculates distances D_j of the respective previous wall positions WP(N−1), WP(N−2), . . . , WP(1) from the own vehicle and azimuths θ_j of the respective previous wall positions WP(N−1), WP(N−2), . . . , WP(1) relative to the own vehicle. Reference character j represents integers from 1 to (N−1). Then, the CPU 71 calculates relative speeds Vr_j of the respective previous wall positions WP(j) relative to the own vehicle in accordance with the speed of the own vehicle and the azimuths θ_j of the respective previous wall positions WP(j).

Next, the CPU 71 substitutes the distances D_j into the expression (1), substitutes the relative speeds Vr_j into the expression (2), and analyzes the substituted expressions (1) and (2) to accordingly calculate up-check frequencies fcku_j and down-check frequencies fckd_j.

Subsequently, the CPU 71 determines predetermined up-check frequency ranges CFu_j, each of which is centered around the corresponding one of the up-check frequencies fcku_j, and determines predetermined down-check frequency ranges CFd_j, each of which is centered around the corresponding one of the down-check frequencies fcku_j.

Additionally, the CPU 71 performs known azimuth expansion of the up-beat average power spectrum within the predetermined up-check frequency range CFu_j thereof to thereby obtain an up-beat azimuth expansion spectrum. Then, the CPU 71 checks, in the up-beat azimuth expansion spectrum, power levels of the respective azimuths θ_j of the previous wall positions WP(j).

Similarly, the CPU 71 performs the known azimuth expansion of the down-beat average power spectrum within the predetermined down-check frequency range CFd_j thereof to thereby obtain a down-beat azimuth expansion spectrum. Then, the CPU 71 checks, in the down-beat azimuth expansion spectrum, power levels of the respective azimuths θ_j of the previous wall positions WP(j).

Following the above power-level check operation in step S650, the CPU 71 determines whether at least one of the power levels of the respective azimuths θ_j in the up-beat azimuth expansion spectrum is larger than or equal to a predetermined second wall-determination power level threshold, and whether at least one of the power levels of the respective azimuths θ_j in the down-beat azimuth expansion spectrum is larger than or equal to the predetermined second wall-determination power level threshold in step S660.

In response to determination that both the at least one of the power levels of the respective azimuths θ_j in the up-beat azimuth expansion spectrum is larger than or equal to the predetermined second wall-determination power level threshold, and the at least one of the power levels of the respective azimuths θ_j in the down-beat azimuth expansion spectrum is larger than or equal to the predetermined second wall-determination power level threshold (YES in step S660), the CPU 71 decrements, by 1, the count of a continuous no-wall counter C4 stored in the RAM 73 in step S670. Then, the extrapolation frequency determination routine proceeds to step S690.

Otherwise, in response to determination that either all the power levels of the respective azimuths θ_j in the up-beat azimuth expansion spectrum are smaller than the predetermined second wall-determination power level threshold, or all the power levels of the respective azimuths θ_j in the down-beat azimuth expansion spectrum are smaller than the predetermined second wall-determination power level threshold (NO in step S660), the CPU 71 increments, by 1, the count of the continuous no-wall counter C4 stored in the RAM 73 in step S680. Then, the extrapolation frequency determination routine proceeds to step S690.

In step S690, the CPU 71 determines whether the count of the continuous no-wall counter C4 is smaller than the value stored in the fourth threshold variable Vth4. The value stored in the fourth threshold Vth4 is set to, for example, 30.

In response to determination that the count of the continuous no-wall counter C4 is smaller than the value stored in the fourth threshold Vth4 (YES in step S690), the CPU 71 clears a second no-wall flag F2 in the RAM 73 to 0 in step S700. Then, the extrapolation frequency determination routine proceeds to step S730.

Otherwise, in response to determination that the count of the continuous no-wall counter C4 is larger than or equal to the value stored in the fourth threshold Vth4 (NO in step S690), the CPU 71 sets the second no-wall flag F2 to 1 in the RAM 73 in step S710. Then, the extrapolation frequency determination routine proceeds to step S730.

Following the operation in step S700 or S710, the CPU 71 determines whether the second no-wall flag F2 has been cleared to 0 in step S730. In response to determination that the second no-wall flag F2 has been set to 1 (NO in step S730), the extrapolation frequency determination routine proceeds to step S750. Otherwise, in response to determination that the second no-wall flag F2 has been cleared to 0 (YES in step S730), the extrapolation frequency determination routine proceeds to step S740.

In step S740, the CPU 71 stores a predetermined first extrapolation frequency N2_h in the second threshold variable Vth2, and thereafter, terminates the extrapolation frequency determination routine.

In step S750, the CPU 71 stores a predetermined second extrapolation frequency N2_l, which is set to be smaller than the first extrapolation frequency N2_h, in the second threshold variable Vth2, and thereafter, terminates the extrapolation frequency determination routine.

The extrapolation frequency determination routine carried out by the CPU 71 of the radar device 12 is substantially identical to that carried out by the CPU 71 of the radar device 11 set forth above except that the CPU 71 of the radar device 12 aims to measure the left-side wall located at the left side of the own vehicle. For this reason, descriptions of the extrapolation frequency determination routine carried out by the CPU 71 of the radar device 12 are omitted.

Figure 9:
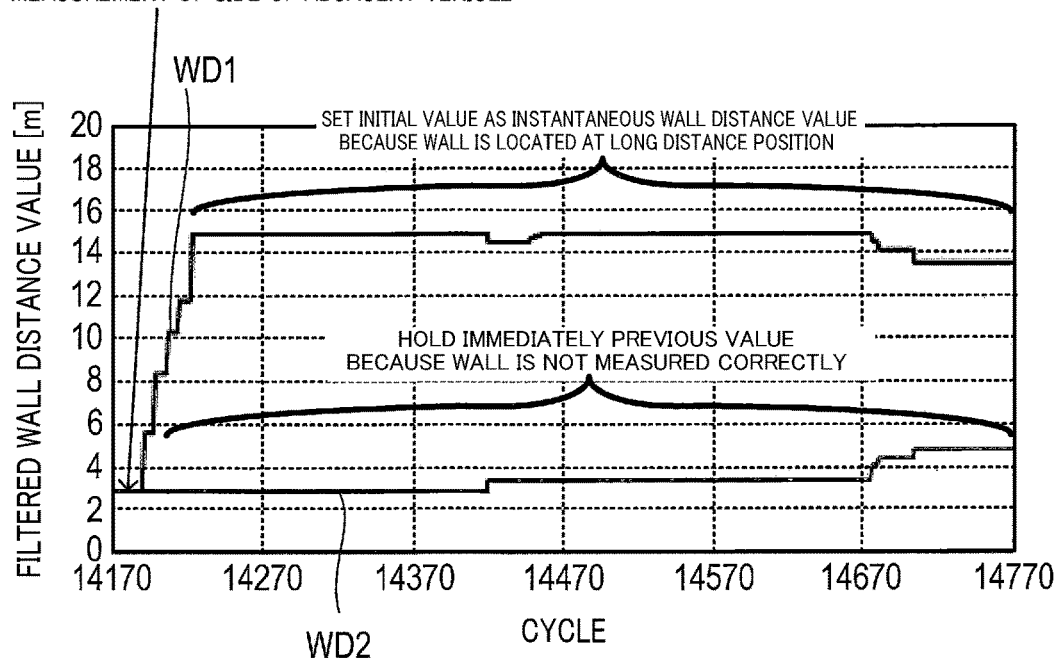
FIG. 9 is a graph illustrating different calculation results of filtered wall distance values due to whether the extrapolation frequency determination routine is carried out.

FIG. 9 is a graph including (1) A first curve WD1 indicative of how the filtered wall distance values calculated in a first case where the own vehicle, which was stopped side-by-side with an adjacent other vehicle in the left or right adjacent lane, starts to travel are changed on a first condition (2) A second curve WD2 indicative of how the filtered wall distance values calculated in a second case where the own vehicle, which was stopped side-by-side with the adjacent other vehicle in the left or right adjacent lane, starts to travel are changed on a second condition The horizontal axis of the graph represents the number of control cycles, and the vertical axis of the graph represents the filtered wall distance values in meters.

The first condition on which the first curve WD1 of the filtered wall distance values is obtained is that the extrapolation frequency determination routine is carried out so that the initial value, i.e., 15 meters, is set as the instantaneous wall distance value each time no detection of the wall has continued for a predetermined number of control cycles.

In contrast, the second condition on which the second curve WD2 of the filtered wall distance values is obtained is that the extrapolation frequency determination routine is not carried out so that the previous instantaneous wall distance value is held even if no detection of the wall has continued for the predetermined number of control cycles.

Figure 10:
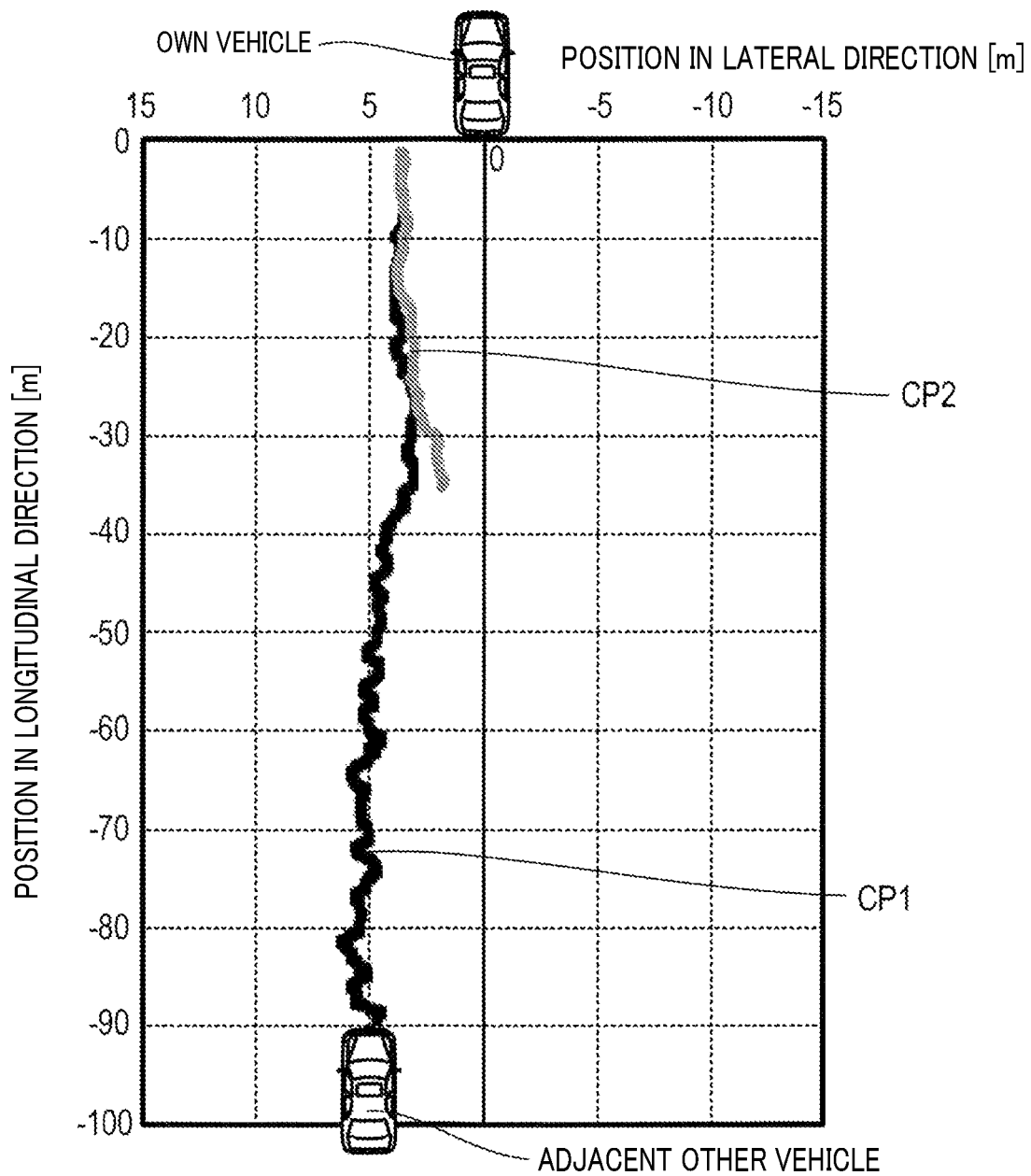
FIG. 10 is a graph illustrating different measurement results of an adjacent other vehicle due to whether the extrapolation frequency determination routine is carried out.

FIG. 10 is a graph including a first curve CP1 indicative of the trajectory of the adjacent other vehicle calculated based on the filtered wall distance values represented by the first curve WD1 in a third case. The third case is that the own vehicle, which was stopped side-by-side with the adjacent other vehicle in the left or right adjacent lane, starts to travel are changed on the first condition, and thereafter, the adjacent other vehicle has approached the own vehicle from the rear side thereof.

The horizontal axis of the graph represents position in the lateral direction when the location of the own vehicle is set to an origin point of the graph, and the vertical axis of the graph represents position in the longitudinal direction when the location of the own vehicle is set to the origin point of the graph.

The first curve CP1 shows that execution of the extrapolation frequency determination routine enables the adjacent other vehicle, which is at least 90 meters away from the own vehicle, to be measured.

A second curve CP2 in the graph represents the trajectory of the adjacent other vehicle calculated based on the filtered wall distance values represented by the second curve WD2 in a fourth case. The fourth case is that the own vehicle, which was stopped side-by-side with the adjacent other vehicle in the left or right adjacent lane, starts to travel are changed on the second condition, and thereafter, the adjacent other vehicle has approached the own vehicle from the rear side thereof.

The second curve CP2 shows that the adjacent other vehicle cannot be measured until the adjacent other vehicle has approached within 35 meters of the own vehicle due to an improper increase in the frequency of extrapolation. That is, when the own vehicle is stopped side-by-side with the adjacent other vehicle in the left or right adjacent lane, the near side of the adjacent other vehicle is determined as a wall. Thus, after the own vehicle starts to travel, it is determined that the wall is lost due to disappearance of any other vehicle located just beside the own vehicle. This results in the CPU 71 of the radar device 11 or 12 being shifted in an extrapolation mode in which the extrapolation is continuously carried out.

If, thereafter, no wall is measured by the radar device 11 or 12, the CPU 71 continuously operates in the extrapolation mode, so that the frequency of extrapolation improperly increases. This results in the wall-profile values based on the filtered wall distance values being continuously calculated as if the wall were located just beside the own vehicle. This may cause an approaching vehicle located outside the wall profile of the wall-profile values to be erroneously determined as a mirror ghost, resulting in delay of measurement of the approaching vehicle.

Figure 11A:
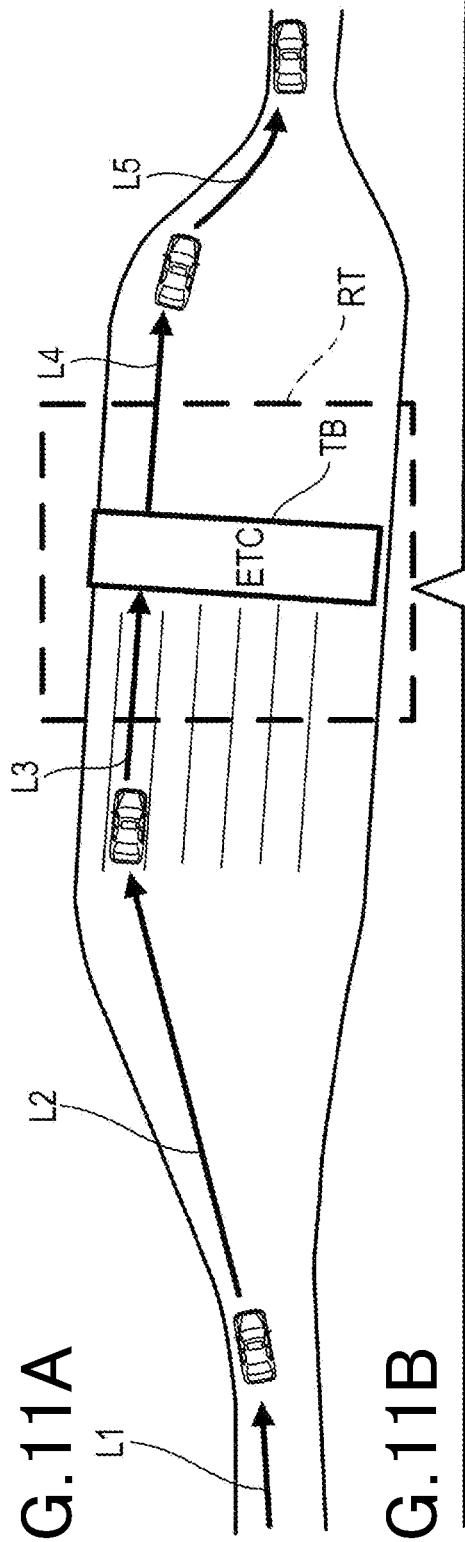
FIGS. 11A and 11B are a joint diagram illustrating different calculation results of filtered wall distance values if an own vehicle has passed through a tollbooth.
Figure 11B:
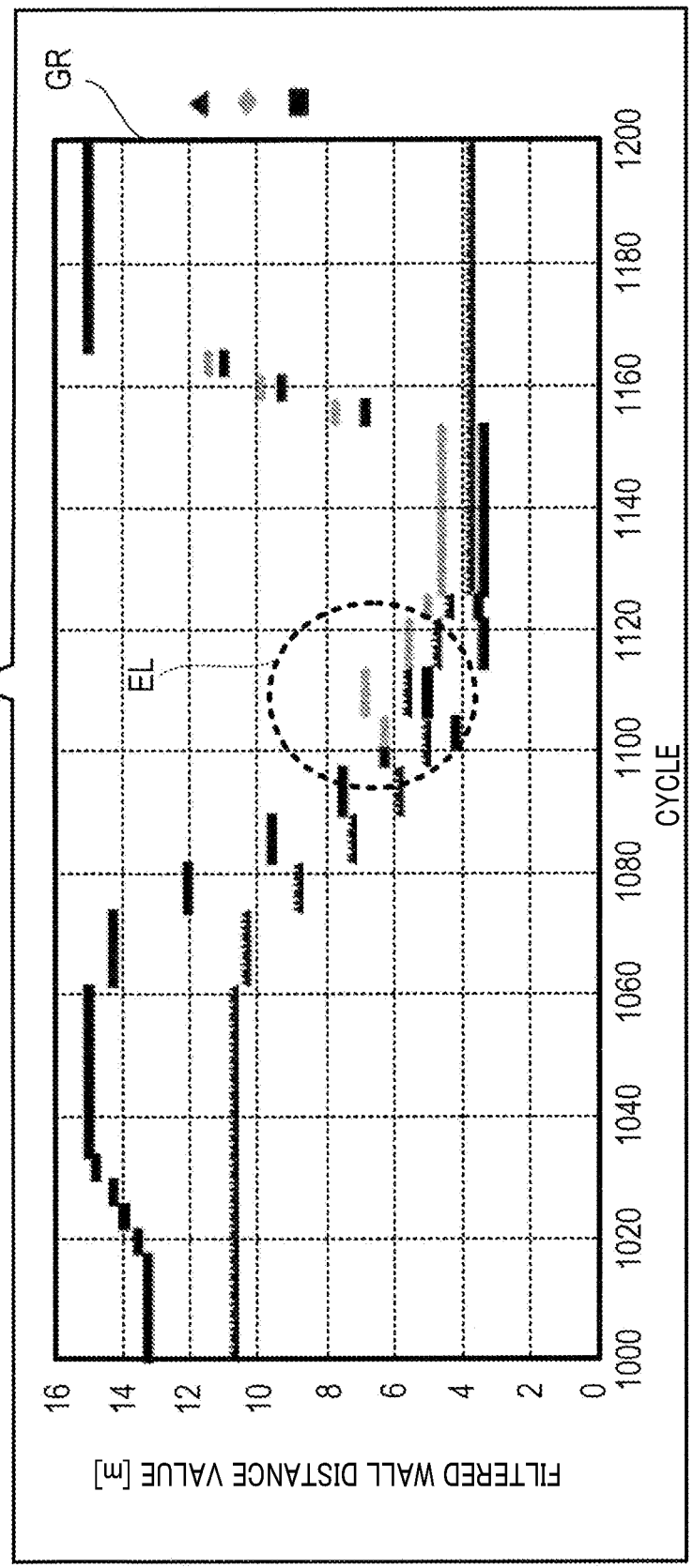

A graph GR illustrated in the joint diagram of FIG. 11 illustrates first to third calculation results of filtered wall distance values if the own vehicle, which has approached a tollbooth TB equipped with an electronic toll collection (ETC®) lane, passes through the ETC lane of the tollbooth TB, and thereafter goes out of the tollbooth TB (see arrows L1, L2, L3, L4, and L5). The horizontal axis of the graph GR represents the number of control cycles, and the vertical axis of the graph GR represents the filtered wall distance values in meters.

First plotted data points, each of which has a triangular shape "A" show the first calculation result of the filtered wall distance values; the first calculation result is obtained on a third condition that the extrapolation frequency determination routine and the constant determination subroutine are not carried out.

Second plotted data points, each of which has a diamond shape "0", show the second calculation result of the filtered wall distance values; the second calculation result is obtained on a fourth condition that the extrapolation frequency determination routine is carried out but the constant determination subroutine is not carried out.

Third plotted data points, each of which has a rectangular shape "D", show the third calculation result of the filtered wall distance values; the third calculation result is obtained on a fifth condition that both the extrapolation frequency determination routine and the constant determination subroutine are carried out.

In the graph GR, the third plotted data points enclosed with a dashed ellipse EL show that execution of the constant determination subroutine results in an improvement of the tracking performance of the filtered wall distance values, which track actual wall distance values including sudden change values.

Each of the radar devices 11 and 12 described above is configured to repeatedly perform a determination task of 1. Transmitting a radar-wave signal to the corresponding measurement range 2. Receiving, as a received signal Sr, an echo signal resulting from reflection of the radar-wave signal by an object;

3. Executing, based on the received signal Sr, determination of whether measurement of a wall located along a road on which the own vehicle travels has succeeded Each of the radar devices 11 and 12 is configured to calculate an instantaneous wall-distance value indicative of a distance of the wall object from the own object in response to each determination that measurement of the wall object has succeeded;

Each of the radar devices 11 and 12 is configured to calculate a plurality of wall-profile values in accordance with a trajectory of the own vehicle and the calculated instantaneous wall-distance values; each of the wall-profile values represents a location of a corresponding part of the wall.

Each of the radar devices 11 and 12 is configured to execute a first extrapolation of an additional instantaneous wall-distance value in response to each determination that measurement of the wall object has not succeeded.

Each of the radar devices 11 and 12 is configured to determine whether the frequency of continuously repeated executions of the first extrapolation of the additional instantaneous wall-distance value is not less than the value stored in the second threshold variable Vth2, and prevent an additional execution of the first extrapolation in response to determination that the frequency of continuously repeated executions of the first extrapolation of the additional instantaneous wall-distance value is not less than the value stored in the second threshold variable Vth2.

Each of the radar devices 11 and 12 is configured to determine whether a result of the determination of whether the measurement of the wall has succeeded is correct.

In response to determination that the result of the determination of whether the measurement of the wall has succeeded is correct, each of the radar devices 11 and 12 is configured to set the first extrapolation frequency N2_h as the value stored in the second threshold variable Vth2. Otherwise, in response to determination that the result of the determination of whether the measurement of the wall has succeeded is incorrect, each of the radar devices 11 and 12 is configured to set the second extrapolation frequency N2_l, which is smaller than the first extrapolation frequency N2_h, as the value stored in the second threshold variable Vth2.

Each of the first and second radar devices 11 and 12 is configured to perform the known azimuth expansion of a power spectrum indicative of the relationship between power levels and respective frequencies of a beat signal for each of the previous wall positions WPU) to accordingly generate an azimuth expansion spectrum for each of the previous wall positions WPU). The azimuth expansion spectrum for each of the previous wall positions WPU) represents a relationship between the corresponding beat signal and a corresponding azimuth of the wall.

Then, each of the first and second radar devices 11 and 12 is configured to determine whether the power level at the azimuth $\theta\_j$ corresponding to each previous wall position WPU) in the azimuth expansion spectrum satisfies a predetermined power existence requirement to accordingly determine whether determination of whether measurement of the wall located along the road for each previous wall position WPU) has succeeded. The predetermined power existence requirement, serving as a determination condition used in step S660, is defined as a power threshold level such that, if the power level at the azimuth $\theta\_j$ of a selected one of the previous wall positions WPU) is larger than or equal to the power threshold level, power exists at the azimuth $\theta\_j$ of the selected one of the previous wall positions WPU).

As described above, in response to each determination that measurement of the wall object has not succeeded, each of the radar devices 11 and 12 is configured to execute a first extrapolation of an additional instantaneous wall-distance value.

For this reason, if a first situation where there is no adjacent other vehicle between the wall and the own vehicle is changed to a second situation where there is an adjacent other vehicle between the wall and the own vehicle, each of the radar devices 11 and 12 is configured to determine that it is difficult to measure the wall, and calculate one or more additional instantaneous wall-distance values after the difficulty determination based on the instantaneous wall-distance value calculated immediately before the difficulty determination. This configuration of each of the radar devices 11 and 12 prevents the profile of the wall from being calculated to be closer to the own vehicle than an actual location of the wall.

Let us assume a situation where an adjacent other vehicle is located on a right or left side of the stopped own vehicle. In this situation, each of the radar devices 11 and 12 may measure the near side of the adjacent other vehicle as a wall to accordingly calculate an instantaneous wall-distance value for the misrecognized wall. Thereafter, when the own vehicle starts to travel earlier than the adjacent other vehicle, no adjacent other vehicle is located on the right or left side of the own vehicle. Thereafter, if each of the first and second radar devices 11 and 12 cannot measure a wall located on the right or left side of the own vehicle because the wall is located to be extremely far from the own vehicle or there are no walls, each of the first and second radar devices 11 and 12 is configured to extrapolate a distance value between the stopped own vehicle and the adjacent other vehicle as an additional instantaneous wall-distance value for the misrecognized wall.

From this viewpoint, in response to determination that the result of the determination of whether the measurement of the wall located along the road has succeeded is incorrect, each of the radar devices 11 and 12 is configured to set the value of second threshold variable Vth2 to be smaller than that set in response to determination that the result of the determination of whether the measurement of the wall located along the road has succeeded is correct. This configuration reduces continuation of the profile of the wall being calculated to be closer to the own vehicle than the actual location of the wall.

Each of the radar devices 11 and 12 is configured to determine whether an unmeasurable condition, which represents continuation of a wall being unmeasurable, is satisfied. The satisfaction of the unmeasurable condition means the negative determination in step S510 or S520. In response to determination that the unmeasurable condition is satisfied, each of the radar devices 11 and 12 is configured to calculate the wall-profile values WP(N), WP(N−1), . . . , and WP(0) such that the minimum distance of each of the wall-profile values WP(N), WP(N−1), . . . , and WP(0) from the trajectory of the own vehicle matches a corresponding one of predetermined filtered initial wall distance values FV(N), FV(N−1), . . . , and FV(0).

Setting each of the filtered initial wall distance values FV(N), FV(N−1), . . . , and FV(0) to be larger than an instantaneous wall-distance value calculated in the situation where the near side of the adjacent other vehicle is misrecognized as a wall prevents the profile of the wall from being calculated to be closer to the own vehicle than the actual location of the wall.

Each of the radar devices 11 and 12 is configured to determine whether there is a parallel traveling vehicle on an adjacent lane located on a corresponding one side of the own vehicle. The parallel traveling vehicle is an obstacle blocking measurement of a wall. In response to determination that there is a parallel traveling vehicle in the adjacent lane, each of the radar devices 11 and 12 is configured to execute second extrapolation of a predicted instantaneous wall-distance value. Thereafter, in response to determination that an obstacle-based continuous extrapolation frequency indicative of the frequency of continuously repeated executions of the second extrapolation, which is a value of the wall unmeasurable counter C1, is larger than or equal to a value of the first threshold variable Vth1, each of the radar devices 11 and 12 prevents an additional execution of the second extrapolation. Additionally, each of the radar devices 11 and 12 is configured to set a value to be stored in the first threshold variable Vth1; the value stored in the first threshold variable Vth1 has a positive correlation with an inter-lane distance between the own-vehicle lane and the adjacent lane of the parallel traveling vehicle. The value set as the first threshold variable Vth1, which has the positive correlation with an inter-lane distance, means that the value set as the first threshold variable Vth1 continuously or stepwise increases with an increase in the inter-lane distance.

The above configuration of each of the radar devices 11 and 12 reduces continuation of the profile of the wall being calculated to be closer to the own vehicle than the actual location of the wall.

Each of the radar devices 11 and 12 is configured to perform filtering of the instantaneous wall distance value to thereby calculate a filtered wall distance value for each control cycle. Then, each of the radar devices 11 and 12 is configured to analyze the filtered wall distance values and the trajectory of the own vehicle to thereby calculate the wall-profile values.

Additionally, each of the radar devices 11 and 12 is configured to determine a value of a reliability parameter for the calculated instantaneous wall distance values. Then, each of the radar devices 11 and 12 is configured to determine a value of the filter constant variable FT used by the filtering such that the tracking performance of the filtered wall distance values, which track the respective instantaneous wall distance values, has a positive correlation with the value of the reliability parameter. The tracking performance of the filtered wall distance values, which has a positive correlation with the value of the reliability parameter, means that the tracking performance of the filtered wall distance values continuously or stepwise increases with an increase in the value of the reliability parameter.

Each of the first and second radar devices 11 and 12 is configured to calculate the variance of the instantaneous wall distance values that have been calculated during the continuous measurement period, and determine whether the variance is smaller than the predetermined variance determination threshold JV1.

In response to determination that the variance is smaller than the predetermined variance determination threshold JV1, each of the first and second radar devices 11 and 12 is configured to determine the value of the reliability parameter; the value of the reliability parameter has a positive correlation with the continuous measurement period. The value of the reliability parameter, which has a positive correlation with the continuous measurement period, means that the value of the reliability parameter continuously or stepwise increases with an increase in the continuous measurement period.

The above configuration of each of the first and second radar devices 11 and 12 enables more improvement of the tracking performance of the filtered wall distance values, which track the respective instantaneous wall distance values, when the value of the reliability parameter becomes larger, making it possible to prevent the profile of the wall from being strongly different from that of the actual wall.

Each of the radar devices 11 and 12 according to the exemplary embodiment serves as a wall profile measurement apparatus, and the operation in step S50 serves as a wall measurement determiner. A wall located on the right or left side of the own vehicle corresponds to a wall object.

The operation in step S60 serves as a wall distance calculator, and an instantaneous wall distance value corresponds to wall distance value. The operation in step S230 corresponds to a wall profile calculator.

The operation in step S170 serves as an extrapolation unit, and a value stored in the second threshold variable Vth2 corresponds to a prevention threshold frequency. The operation in each of steps S130 and S180 serves as an extrapolation prevention unit, and a value stored in the lost wall counter C2 corresponds to an extrapolation frequency. The operations in steps S650 to S730 serve as a correctness determiner.

The operation in each of steps S740 and S750 serves as an extrapolation frequency determiner, the first extrapolation frequency N2_h corresponds to a correct-state threshold, and the second extrapolation frequency N2_1 corresponds to an incorrect-state threshold.

The operation in each of steps S510 and S520 serves as a measurable situation determiner, the operation in step S40 serves as an obstacle determiner, and the operation in step S120 serves as an obstacle-based extrapolation unit.

The operation in step S110 serves as an obstacle-based extrapolation prevention unit, a value stored in the wall unmeasurable counter C1 corresponds to an obstacle-based continuous extrapolation frequency, and a value stored in the first threshold variable Vth1 corresponds to an obstacle-based extrapolation threshold. The operations in steps S80 to S100 serve as an obstacle-based extrapolation frequency determiner.

The operations in respective steps S320, S350, and S380 serve as a reliability determiner, and the operations in respective steps S330, S360, S390, and S400 serve as a filter constant determiner.

The power level of each beat signal corresponds to a power parameter, the frequency of each beat signal corresponds to a distance parameter, and the azimuth of a wall relative to the own vehicle corresponds to an azimuth parameter.

The exemplary embodiment of the present disclosure has been described, but the present disclosure is not limited to the exemplary embodiment, and therefore can be variously modified for example as follows:

First Modification

The exemplary embodiment employs the known FMCW mode to thereby measure objects, but the present disclosure can employ, for example, one of the known dual-frequency CW mode and a known FCM mode.

Second Modification

The exemplary embodiment is configured to track one or more same objects to thereby determine whether there is a parallel traveling vehicle on an adjacent lane, but the present disclosure is not limited to this configuration.

Specifically, let us assume that the present disclosure employs the known dual-frequency CW mode. In this assumption, a power spectrum obtained based on echo signals from reflection of transmitted radar wave signal by wheels of a parallel traveling vehicle include many peaks in a wide frequency range. This is because the wheels of the parallel traveling vehicle have various speed components. From this viewpoint, the present disclosure, which employs the known dual-frequency CW mode, can be configured to determine that there is a parallel traveling vehicle on an adjacent lane in response to determination that the power spectrum includes many peaks in the wide frequency range.

Third Modification

The exemplary embodiment is configured to perform the operation in steps S650 and S660 to thereby determine whether a result of the determination of whether the measurement of the wall located along the road has succeeded is correct, but the present disclosure is not limited to this configuration.

Specifically, the present disclosure can be configured to
(i) Extract one or more peaks from a power spectrum indicative of the relationship between power levels and respective frequencies of a beat signal for each of the previous wall positions WP(j)
(ii) Determine whether the frequencies of the beat signal for each of the previous wall positions WP(j) include the one or more peaks extracted form the power spectrum for the corresponding one of the previous wall positions WP(j) to accordingly determine whether a result of the determination of whether the measurement of the wall located along the road has succeeded is correct The power spectrum can include all azimuths measurable by each of the radar devices 11 and 12, or one or more azimuths indicative of the corresponding one of the right and left of the own vehicle. Using the power spectrum including one or more azimuths corresponding to the corresponding right or left of the own vehicle enables easier extraction of one or more peaks corresponding to the wall location.

The processing unit 70 and methods performed by the processing unit 70 described in the present disclosure can be implemented by a dedicated computer including a memory and a processor programmed to perform one or more functions embodied by one or more computer programs.

The processing unit 70 and methods performed by the processing unit 70 can also be implemented by a dedicated computer including a processor comprised of one or more dedicated hardware logic circuits.

The processing unit 70 and methods performed by the processing unit 70 described in the present disclosure can further be implemented by at least one dedicated computer comprised of a memory, a processor programmed to perform one or more functions embodied by one or more computer programs, and one or more hardware logic circuits.

The one or more computer programs can be stored in a non-transitory storage medium as instructions to be carried out by a computer. The one or more methods for implementing the function of each unit included in the processing unit 70 do not need to include software, and therefore all functions included in the processing unit 70 implemented by one or more hardware units.

The functions of one element in the exemplary embodiment can be distributed as plural elements, and the functions that plural elements have can be combined into one element. The functions of respective elements in the exemplary embodiment can be implemented by a single element, and the single function implemented by plural elements in the exemplary embodiment can be implemented by a single element. At least part of the structure of the exemplary embodiment can be eliminated. At least part of the exemplar embodiment can be added to the structure of each of the first to third modifications, or can be replaced with a corresponding part of each of the first to third modifications.

The present disclosure can be implemented by various embodiments in addition to the radar device 11 or 12; the various embodiments include systems each include the radar device 11 or 12, programs for causing a computer to serve as the processing unit 70 of the radar device 11 or 12, non-volatile storage media, such as semiconductor memories, storing the programs, and wall profile measurement methods.

What is claimed is:

1. A wall profile measurement apparatus to be installed in an own vehicle comprising:
a wall measurement determiner configured to repeatedly perform a determination task of:
transmitting a radar-wave signal to a corresponding measurement range;
receiving, as a received signal, an echo signal resulting from reflection of the radar-wave signal by an object; and
executing, based on the received signal, determination of whether measurement of a wall object located along a road on which the own vehicle travels has succeeded;
a wall distance calculator configured to calculate an instantaneous wall-distance value indicative of a distance of the wall object from the own object in response to each determination that measurement of the wall object has succeeded;
a wall profile calculator configured to calculate a plurality of wall-profile values in accordance with a trajectory of the own vehicle and the calculated instantaneous wall-distance values, each of the wall-profile values representing a location of a corresponding part of the wall object;
an extrapolation unit configured to execute a first extrapolation of an additional instantaneous wall-distance value in response to each determination that measurement of the wall object has not succeeded;
an extrapolation prevention unit configured to:
determine whether a frequency of continuously repeated executions of the first extrapolation is not less than a prevention threshold frequency; and prevent an additional execution of the first extrapolation in response to determination that the frequency of continuously repeated executions of the first extrapolation is not less than the prevention threshold frequency;
a correctness determiner configured to determine whether a result of the determination of whether the measurement of the wall object has succeeded is correct;
an extrapolation frequency setter configured to:
set, in response to determination that the result of the determination of whether the measurement of the wall object has succeeded is correct, a correct-state threshold as the prevention threshold frequency; and
set, in response to determination that the result of the determination of whether the measurement of the wall object has succeeded is incorrect, an incorrect-state threshold as the prevention threshold frequency, the incorrect-state threshold being smaller than the correct-state threshold.

2. The wall profile measurement apparatus according to claim 1, further comprising:
a measurable state determiner configured to determine whether an unmeasurable condition is satisfied, the unmeasurable condition representing continuation of the wall object being unmeasurable,
wherein:
the wall profile calculator is configured to calculate the plurality of wall-profile values such that a minimum distance of each of the wall-profile values from the trajectory of the own vehicle matches a corresponding one of predetermined initial wall distance values.

3. The wall profile measurement apparatus according to claim 1, further comprising:
an obstacle determiner configured to determine whether there is an obstacle blocking measurement of the wall object;
an obstacle-based extrapolation unit configured to, in response to determination that there is an obstacle blocking measurement of the wall object, execute a second extrapolation of a predicted instantaneous wall-distance value;
an obstacle-based extrapolation prevention unit configured to:
determine whether an obstacle-based continuous extrapolation frequency indicative of a frequency of continuously repeated executions of the second extrapolation is larger than or equal to a predetermined obstacle-based extrapolation threshold; and
prevent an additional execution of the second extrapolation in response to determination that the obstacle-based continuous extrapolation frequency is larger than or equal to the predetermined obstacle-based extrapolation threshold; and
an obstacle-based extrapolation frequency determiner configured to determine a value of the obstacle-based extrapolation threshold such that the value of the obstacle-based extrapolation threshold has a positive correlation with an inter-lane distance between a lane on which the own vehicle travels and an adjacent lane on which the obstacle is located on one side of the own vehicle.

4. The wall profile measurement apparatus according to claim 2, further comprising:
an obstacle determiner configured to determine whether there is an obstacle blocking measurement of the wall object;
an obstacle-based extrapolation unit configured to, in response to determination that there is an obstacle blocking measurement of the wall object, execute second extrapolation of a predicted instantaneous wall-distance value;
an obstacle-based extrapolation prevention unit configured to:
determine whether an obstacle-based continuous extrapolation frequency indicative of a frequency of continuously repeated executions of the second extrapolation is larger than or equal to a predetermined obstacle-based extrapolation threshold; and
prevent an additional execution of the second extrapolation in response to determination that the obstacle-based continuous extrapolation frequency is larger than or equal to the predetermined obstacle-based extrapolation threshold; and
an obstacle-based extrapolation frequency determiner configured to determine a value of the obstacle-based extrapolation threshold such that the value of the obstacle-based extrapolation threshold has a positive correlation with an inter-lane distance between a lane on which the own vehicle travels and an adjacent lane on which the obstacle is located on one side of the own vehicle.

5. The wall profile measurement apparatus according to claim 1, wherein:
the wall profile calculator is configured to:
perform filtering of each of the calculated instantaneous wall-distance values to thereby calculate a corresponding one of filtered wall distance values, the filtering using a filter constant; and
analyze the filtered wall distance values and the trajectory of the own vehicle to accordingly calculate the wall profile values,
the wall profile measurement apparatus further comprising:
a reliability determiner configured to determine a value of a reliability parameter for the calculated instantaneous wall distance values; and
a filter constant determiner configured to determine a value of the filter constant used by the filtering such that a tracking performance of the filtered wall distance values, which track the respective instantaneous wall distance values, has a positive correlation with the value of the reliability parameter.

6. The wall profile measurement apparatus according to claim 2, wherein:
the wall profile calculator is configured to:
perform filtering of each of the calculated instantaneous wall-distance values to thereby calculate a corresponding one of filtered wall distance values, the filtering using a filter constant; and
analyze the filtered wall distance values and the trajectory of the own vehicle to accordingly calculate the wall profile values,
the wall profile measurement apparatus further comprising:
a reliability determiner configured to determine a value of a reliability parameter for the calculated instantaneous wall distance values; and
a filter constant determiner configured to determine a value of the filter constant used by the filtering such that a tracking performance of the filtered wall distance values, which track the respective instantaneous wall distance values, has a positive correlation with the value of the reliability parameter.

7. The wall profile measurement apparatus according to claim 3, wherein:
the wall profile calculator is configured to:
perform filtering of each of the calculated instantaneous wall-distance values to thereby calculate a corresponding one of filtered wall distance values, the filtering using a filter constant; and
analyze the filtered wall distance values and the trajectory of the own vehicle to accordingly calculate the wall profile values,
the wall profile measurement apparatus further comprising:
a reliability determiner configured to determine a value of a reliability parameter for the calculated instantaneous wall distance values; and
a filter constant determiner configured to determine a value of the filter constant used by the filtering such that a tracking performance of the filtered wall distance values, which respectively track the calculated instantaneous wall distance values, has a positive correlation with the value of the reliability parameter.

8. The wall profile measurement apparatus according to claim 4, wherein:
the reliability determiner is configured to:
calculate a variance of the calculated instantaneous wall distance values that have been calculated during a predetermined continuous measurement period in response to determination that the wall object has been continuously measured for the predetermined continuous measurement period;
determine whether the variance is smaller than a predetermined variance determination threshold; and
determine, in response to determination that the variance is smaller than the predetermined variance determination threshold, the value of the reliability parameter such that the value of the reliability parameter has a positive correlation with the continuous measurement period.

9. The wall profile measurement apparatus according to claim 1, wherein:
the correctness determiner configured to:
perform an azimuth expansion of a power spectrum indicative of a first relationship between a power parameter related to power of the received signal and a distance parameter related to a distance of the wall object for each of the wall-profile values to accordingly generate an azimuth expansion spectrum for each of the wall-profile values, the azimuth expansion spectrum for each of the wall-profile values representing a second relationship between the corresponding power parameter and a corresponding azimuth parameter;
determine whether a value of the power parameter at a corresponding value of the azimuth parameter for each of the wall-profile values in the azimuth expansion spectrum satisfies a predetermined power existence requirement to accordingly determine whether determination of whether measurement of the wall object located along the road has succeeded,
the predetermined power existence requirement being defined as a power threshold level such that, if the value of the power parameter at the corresponding value of the azimuth parameter of a selected one of the wall-profile values is larger than or equal to the power threshold level, power exists at the value of the azimuth parameter of the selected one of the wall-profile values.

10. The wall profile measurement apparatus according to claim 1, wherein:
the correctness determiner configured to:
extract one or more peaks from a power spectrum, the power spectrum representing a relationship between a power parameter related to power of the received signal and a distance parameter related to a distance of the wall object for each of the wall-profile values; and
determine whether one or more values of the distance parameter, each of which corresponds to one of the wall-profile values, respectively match the one or more peaks to accordingly determine whether determination of whether measurement of the wall object located along the road has succeeded.

11. A wall profile measurement method comprising:
repeatedly performing a determination task of:
transmitting a radar-wave signal to a corresponding measurement range;
receiving, as a received signal, an echo signal resulting from reflection of the radar-wave signal by an object;
executing, based on the received signal, determination of whether measurement of a wall object located along a road on which the own vehicle travels has succeeded;
calculating an instantaneous wall-distance value indicative of a distance of the wall object from the own object in response to each determination that measurement of the wall object has succeeded;
calculating a plurality of wall-profile values in accordance with a trajectory of the own vehicle and the calculated instantaneous wall-distance values, each of the wall-profile values representing a location of a corresponding part of the wall object;
executing a first extrapolation of an additional instantaneous wall-distance value in response to each determination that measurement of the wall object has not succeeded;
determining whether a frequency of continuously repeated executions of the first extrapolation is not less than a prevention threshold frequency; preventing an additional execution of the first extrapolation in response to determination that the frequency of continuously repeated executions of the first extrapolation is not less than the prevention threshold frequency;
determining whether a result of the determination of whether the measurement of the wall object has succeeded is correct;
setting, in response to determination that the result of the determination of whether the measurement of the wall object has succeeded is correct, a correct-state threshold as the prevention threshold frequency; and
setting, in response to determination that the result of the determination of whether the measurement of the wall object has succeeded is incorrect, an incorrect-state threshold as the prevention threshold frequency, the incorrect-state threshold being smaller than the correct-state threshold.

* * * * *